US012213208B2

(12) United States Patent
Zhu et al.

(10) Patent No.: US 12,213,208 B2
(45) Date of Patent: Jan. 28, 2025

(54) SMALL DATA TRANSMISSIONS IN AN INACTIVE STATE TO DISAGGREGATED BASE STATIONS

(71) Applicant: QUALCOMM Incorporated, San Diego, CA (US)

(72) Inventors: Xipeng Zhu, San Diego, CA (US); Gavin Bernard Horn, La Jolla, CA (US); Miguel Griot, La Jolla, CA (US); Ruiming Zheng, Beijing (CN)

( * ) Notice: Subject to any disclaimer, the term of this patent is extended or adjusted under 35 U.S.C. 154(b) by 260 days.

(21) Appl. No.: 17/760,225

(22) PCT Filed: Mar. 12, 2020

(86) PCT No.: PCT/CN2020/078976
§ 371 (c)(1),
(2) Date: Aug. 5, 2022

(87) PCT Pub. No.: WO2021/179245
PCT Pub. Date: Sep. 16, 2021

(65) Prior Publication Data
US 2023/0075703 A1  Mar. 9, 2023

(51) Int. Cl.
H04W 76/30 (2018.01)
H04W 76/27 (2018.01)

(52) U.S. Cl.
CPC .......... H04W 76/30 (2018.02); H04W 76/27 (2018.02)

(58) Field of Classification Search
CPC . H04W 76/30; H04W 76/27; H04W 28/0252; H04W 40/005; H04W 40/24;
(Continued)

(56) References Cited

U.S. PATENT DOCUMENTS

2018/0139778 A1  5/2018 Chou et al.
2018/0368204 A1  12/2018 Park et al.
2019/0230723 A1  7/2019 Kim et al.

FOREIGN PATENT DOCUMENTS

CN    109588059 A   4/2019
CN    110139386 A   8/2019
(Continued)

OTHER PUBLICATIONS

Huawei, et al., "Further views on Rel-17 small data work area" 3GPP TSG RAN Meeting #85, RP-191833, 3rd Generation Partnership Project, Mobile Competence Centre, 650, Route Des Lucioles, F-06921 Sophia-Antipolis Cedex, France, vol. TSG RAN, No. Newport Beach, US, Sep. 16, 2019-Sep. 20, 2019, Sep. 9, 2019, 5 Pages, XP051782382.
(Continued)

Primary Examiner — Ayanah S George

(57) ABSTRACT

Methods, systems, and devices for wireless communications are described. Generally, a user equipment (UE) may directly send small data to a disaggregated base station without performing a random access procedure. The CU-CP may provide a list of routing identifiers and corresponding data resource bearers (DRBs) to a distributed unit (DU) and the DU may transmit a connection release message to the UE. The connection release message may include the list of routing identifiers and the list of DRB identifiers. The connection release message may also include a downlink monitoring timer. The UE may identify data for an uplink transmission and a DRB associated with that data. The UE may transmit a packet with the data and the routing identifiers to a DU, which may derive downlink address information from the routing identifiers and forward the data to a CU-UP of the aggregated base station.

35 Claims, 16 Drawing Sheets

(58) Field of Classification Search
CPC ..... H04W 76/11; H04W 72/04; H04W 24/08; H04W 68/02
See application file for complete search history.

(56) References Cited

FOREIGN PATENT DOCUMENTS

| | | | |
|---|---|---|---|
| CN | 110139387 A | | 8/2019 |
| CN | 110351899 A | | 10/2019 |
| WO | WO-2019062794 A1 | | 4/2019 |
| WO | WO-2019196765 A1 | | 10/2019 |
| WO | WO-2020034560 A1 | * | 2/2020 ........ H04W 28/0278 |
| WO | WO-2020087280 A1 | * | 5/2020 |

OTHER PUBLICATIONS

Supplementary European Search Report—EP20924574—Search Authority—Munich—Nov. 9, 2023.
Catt: "UL Small Data Transmission in Inactive State", 3GPP TSG-RAN WG3 #Ad-hoc, R3-170073, Spokane, Washington, USA, Jan. 17-19, 2017, Jan. 19, 2017 (Jan. 19, 2017) Section 2, pp. 1-3.
International Search Report and Written Opinion—PCT/CN2020/078976—ISA/EPO—Dec. 14, 2020.
Qualcomm Incorporated: "Small Data Transmission in Inactive State", 3GPP Draft, R3-170158, 3GPP TSG-RAN WG3 NR Ad Hoc Meeting, Small Data Transmission in Inactive State V3, 3rd Generation Partnership Project (3GPP), Mobile Competence Centre, 650, Route Des Lucioles, F-06921 Sophia-Antipolis Cedex, France, vol. RAN WG3, No. Spokane, Washington; Jan. 17, 2017-Jan. 19, 2017, Jan. 12, 2017, XP051212812, Retrieved from the Internet: URL:http://www.3gpp.org/ftp/Meetings_3GPP_SYNC/RAN3/Docs/ [retrieved on Jan. 12, 2017], part 2, 4 pages.

* cited by examiner

SMALL DATA TRANSMISSIONS IN AN INACTIVE STATE TO DISAGGREGATED BASE STATIONS

CROSS REFERENCE

The present application is a 371 national stage filing of International PCT Application No. PCT/CN2020/078976 by Zhu et al. entitled "SMALL DATA TRANSMISSIONS IN AN INACTIVE STATE TO DISAGGREGATED BASE STATIONS," filed Mar. 12, 2020; which is assigned to the assignee hereof, and which is expressly incorporated by reference in its entirety herein.

FIELD OF TECHNOLOGY

The following relates generally to wireless communications and more specifically to small data transmissions in an inactive state to disaggregated base stations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, a UE may communicate with a disaggregated base station.

SUMMARY

The described techniques relate to improved methods, systems, devices, and apparatuses that support small data transmissions in an inactive state to disaggregated base stations. Generally, the described techniques provide for sending, by a user equipment (UE), small or infrequent data transmissions to a disaggregated base station while in an inactive state (e.g., an radio resource control (RRC) inactive state). The UE may directly send small data to a disaggregated base station without performing a random access procedure. In such examples, a control unit user plane (CU-UP) of the disaggregated base station may determine, independently or by communicating with the control unit user plane (CU-UP) of the disaggregated base station, a set of data resource bearer (DRBs), to remain unsuspended for the UE in an inactive state. The CU-CP may provide this information to a distributed unit (DU) (e.g., an anchor DU), and the DU may transmit a connection release message (e.g., an RRC release message) to the UE. The connection release message may include a list of routing identifiers and a list of DRB identifiers for each of the unsuspended DRBs determined by the CU-CP. In some examples, the connection release message may also include a downlink monitoring timer. The UE may use the routing identifiers and DRB identifiers to transmit small data in an RRC inactive state. For example, (e.g., where the UE has moved during the RRC inactive state to a different DU associated with a different CU-UP), the UE may identify data for an uplink transmission and a DRB associated with that data. The UE may transmit a small data packet with the data (e.g., as a sub protocol data unit (PDU) of a medium access control (MAC) protocol data unit (PDU)), and may indicate the routing identifiers (e.g., in a MAC control element (CE) of the same MAC PDU) to the DU.

The DU may decode the PDU message and may determine address information from the routing identifiers. The address information may include a transport network layer (TNL) address, a tunnel endpoint identifier, or the like. Based on the address information, the DU may forward the data package to CU-UP as a packet data convergence protocol (PDCP) PDU. The CU-UP may process the data. In some examples, the CU-UP may transmit, to the CU-CP, an indication of the uplink data. In some examples, the CU-UP may send the data to the core network for further processing or to initiate a downlink data transmission in response to the uplink data. In some examples, the CU-UP may determine whether to initiate a new connection with the UE. In such examples, the CU-UP may transmit a downlink data notification to the CU-CP, which may send paging information to the DU for forwarding to the UE (e.g., during the downlink monitoring window). A subsequent connection may be established with the appropriate CU-UP (e.g., an access disaggregated base station corresponding to the location of the UE, which may be different than the previous anchor base station).

A method of wireless communications at a UE is described. The method may include receiving, from a first network node, a connection release message instructing the UE to enter an inactive state, the connection release message including a set of routing identifiers, each routing identifier of the set of routing identifiers associated with at least one data radio bearer, entering the inactive state based on receiving the connection release message, identifying data to transmit in the inactive state of the UE and at least one routing identifier of the set of routing identifiers associated with the data, and transmitting, in the inactive state, a packet including the identified data and the at least one routing identifier.

An apparatus for wireless communications at a UE is described. The apparatus may include a processor, memory coupled with the processor, and instructions stored in the memory. The instructions may be executable by the processor to cause the apparatus to receive, from a first network node, a connection release message instructing the UE to enter an inactive state, the connection release message including a set of routing identifiers, each routing identifier of the set of routing identifiers associated with at least one data radio bearer, enter the inactive state based on receiving the connection release message, identify data to transmit in the inactive state of the UE and at least one routing identifier of the set of routing identifiers associated with the data, and transmit, in the inactive state, a packet including the identified data and the at least one routing identifier.

Another apparatus for wireless communications at a UE is described. The apparatus may include means for receiving, from a first network node, a connection release message instructing the UE to enter an inactive state, the connection release message including a set of routing identifiers, each routing identifier of the set of routing identifiers associated with at least one data radio bearer, entering the inactive state based on receiving the connection release message, identifying data to transmit in the inactive state of the UE and at least one routing identifier of the set of routing identifiers associated with the data, and transmitting, in the inactive state, a packet including the identified data and the at least one routing identifier.

A non-transitory computer-readable medium storing code for wireless communications at a UE is described. The code may include instructions executable by a processor to receive, from a first network node, a connection release message instructing the UE to enter an inactive state, the connection release message including a set of routing identifiers, each routing identifier of the set of routing identifiers associated with at least one data radio bearer, enter the inactive state based on receiving the connection release message, identify data to transmit in the inactive state of the UE and at least one routing identifier of the set of routing identifiers associated with the data, and transmit, in the inactive state, a packet including the identified data and the at least one routing identifier.

Some examples of the method, apparatuses, and non-transitory computer-readable medium described herein may further include operations, features, means, or instructions for generating a protocol data unit that includes a sub protocol data unit and a control element, the data unit including the identified data, and the control element including the at least one routing identifier, where transmitting the packet includes transmitting the generated protocol data unit.

In some examples of the method, apparatuses, and non-transitory computer-readable medium described herein, generating the media access control protocol data unit further may include operations, features, means, or instructions for generating the protocol data unit that includes a set of sub protocol data units, the set of sub protocol data units including the sub protocol data unit, each sub protocol data unit of the set of sub protocol data units corresponding to a respective routing identifier of the set of routing identifiers.

In some examples of the method, apparatuses, and non-transitory computer-readable medium described herein, the protocol data unit includes a media access control protocol data unit, the sub protocol data unit includes a media access control sub protocol data unit or a media access control service data unit, and the control element includes a media access control control element.

Some examples of the method, apparatuses, and non-transitory computer-readable medium described herein may further include operations, features, means, or instructions for receiving an indication of a mapping between the set of routing identifiers and a set of data radio bearers, each routing identifier mapped to at least one data radio bearer of the set of data radio bearers, identifying, from the set of data radio bearers, a data radio bearer associated with the data, and determining, based on the received indication of the mapping, the at least one routing identifier of the set of routing identifiers corresponding to the identified data radio bearer.

In some examples of the method, apparatuses, and non-transitory computer-readable medium described herein, transmitting the packet may include operations, features, means, or instructions for transmitting the packet to the first network node.

In some examples of the method, apparatuses, and non-transitory computer-readable medium described herein, transmitting the packet may include operations, features, means, or instructions for transmitting the packet to an additional network node different than the first network node, and receiving, from the additional network node based on transmitting the packet, downlink data.

Some examples of the method, apparatuses, and non-transitory computer-readable medium described herein may further include operations, features, means, or instructions for receiving a downlink monitoring timer in the connection release message.

Some examples of the method, apparatuses, and non-transitory computer-readable medium described herein may further include operations, features, means, or instructions for identifying, based on the received downlink monitoring timer, a downlink monitoring window for the inactive state, and monitoring, in the inactive state, for a downlink transmission during the downlink monitoring window.

Some examples of the method, apparatuses, and non-transitory computer-readable medium described herein may further include operations, features, means, or instructions for receiving, based on the monitoring, a paging message, and establishing a wireless connection based on the received paging message.

In some examples of the method, apparatuses, and non-transitory computer-readable medium described herein, the connection release message includes a radio resource control release message, a wireless connection between the UE and the first network node includes a radio resource control connection, and the inactive state includes a radio resource control inactive state.

In some examples of the method, apparatuses, and non-transitory computer-readable medium described herein, the first network node includes a distributed unit of a disaggregated base station, and the disaggregated base station includes one or more distributed units, a central unit control plane, and one or more central unit user planes.

A method of wireless communications at a first network node is described. The method may include transmitting, to a UE, a connection release message from a second network node instructing the UE to enter an inactive state, the connection release message including a set of routing identifiers, each routing identifier of the set of routing identifiers associated with at least one data radio bearer, receiving, from the UE at least in part in response to the transmitted connection release message, a packet including data and at least one routing identifier of the set of routing identifiers, and transmitting, to a third network node, the data based on the received at least one routing identifier.

An apparatus for wireless communications at a first network node is described. The apparatus may include a processor, memory coupled with the processor, and instructions stored in the memory. The instructions may be executable by the processor to cause the apparatus to transmit, to a UE, a connection release message from a second network node instructing the UE to enter an inactive state, the connection release message including a set of routing identifiers, each routing identifier of the set of routing identifiers associated with at least one data radio bearer, receive, from the UE at least in part in response to the transmitted connection release message, a packet including data and at least one routing identifier of the set of routing identifiers, and transmit, to a third network node, the data based on the received at least one routing identifier.

Another apparatus for wireless communications at a first network node is described. The apparatus may include means for transmitting, to a UE, a connection release message from a second network node instructing the UE to enter an inactive state, the connection release message including a set of routing identifiers, each routing identifier of the set of routing identifiers associated with at least one data radio bearer, receiving, from the UE at least in part in response to the transmitted connection release message, a packet including data and at least one routing identifier of the set of routing identifiers, and transmitting, to a third network node, the data based on the received at least one routing identifier.

A non-transitory computer-readable medium storing code for wireless communications at a first network node is described. The code may include instructions executable by a processor to transmit, to a UE, a connection release message from a second network node instructing the UE to enter an inactive state, the connection release message including a set of routing identifiers, each routing identifier of the set of routing identifiers associated with at least one data radio bearer, receive, from the UE at least in part in response to the transmitted connection release message, a packet including data and at least one routing identifier of the set of routing identifiers, and transmit, to a third network node, the data based on the received at least one routing identifier.

In some examples of the method, apparatuses, and non-transitory computer-readable medium described herein, receiving the data packet may include operations, features, means, or instructions for receiving a protocol data unit that includes a sub protocol data unit and a control element, the data unit including the identified data, and the control element including the at least one routing identifier, where transmitting the packet includes transmitting the generated protocol data unit.

In some examples of the method, apparatuses, and non-transitory computer-readable medium described herein, the protocol data unit includes a set of sub protocol data units, the set of sub protocol data units including the sub protocol data unit, each sub protocol data unit of the set of sub protocol data units corresponding to a respective routing identifier of the set of routing identifiers.

In some examples of the method, apparatuses, and non-transitory computer-readable medium described herein, the protocol data unit includes a media access control protocol data unit, the sub protocol data unit includes a media access control sub protocol data unit or a media access control service data unit, and the control element includes a media access control control element.

Some examples of the method, apparatuses, and non-transitory computer-readable medium described herein may further include operations, features, means, or instructions for determining, based on the at least one routing identifier, address information for the third network node, where transmitting the data to the third network node may be based on the determined address information.

In some examples of the method, apparatuses, and non-transitory computer-readable medium described herein, the address information includes an uplink tunneling identifier, a transport network layer address, or a combination thereof.

In some examples of the method, apparatuses, and non-transitory computer-readable medium described herein, generating a packet data convergence protocol (PDCP) protocol data unit (PPDU), where transmitting the data may include operations, features, means, or instructions for transmitting the PPDU together with the address information.

Some examples of the method, apparatuses, and non-transitory computer-readable medium described herein may further include operations, features, means, or instructions for receiving paging information from the second network node, and transmitting, based on the at least one routing identifier, the paging information to the UE.

In some examples of the method, apparatuses, and non-transitory computer-readable medium described herein, the first network node includes a distributed unit, where the second network node includes a control unit control plane, and where the third network node includes a control unit user plane.

A method of wireless communications at a second network node is described. The method may include transmitting, to a first network node, a connection release message instructing a UE to enter an inactive state, the connection release message including a set of routing identifiers, each routing identifier of the set of routing identifiers associated with at least one data radio bearer and receiving, from a third network node, an indication of data transmitted from the UE to the third network node at least in part in response to the transmitted connection release message.

An apparatus for wireless communications at a second network node is described. The apparatus may include a processor, memory coupled with the processor, and instructions stored in the memory. The instructions may be executable by the processor to cause the apparatus to transmit, to a first network node, a connection release message instructing a UE to enter an inactive state, the connection release message including a set of routing identifiers, each routing identifier of the set of routing identifiers associated with at least one data radio bearer and receive, from a third network node, an indication of data transmitted from the UE to the third network node at least in part in response to the transmitted connection release message.

Another apparatus for wireless communications at a second network node is described. The apparatus may include means for transmitting, to a first network node, a connection release message instructing a UE to enter an inactive state, the connection release message including a set of routing identifiers, each routing identifier of the set of routing identifiers associated with at least one data radio bearer and receiving, from a third network node, an indication of data transmitted from the UE to the third network node at least in part in response to the transmitted connection release message.

A non-transitory computer-readable medium storing code for wireless communications at a second network node is described. The code may include instructions executable by a processor to transmit, to a first network node, a connection release message instructing a UE to enter an inactive state, the connection release message including a set of routing identifiers, each routing identifier of the set of routing identifiers associated with at least one data radio bearer and receive, from a third network node, an indication of data transmitted from the UE to the third network node at least in part in response to the transmitted connection release message.

Some examples of the method, apparatuses, and non-transitory computer-readable medium described herein may further include operations, features, means, or instructions for transmitting, to the third network node, a bearer modification request message, and receiving, from the third network node in response to the bearer modification request message, a bearer modification response message, where transmitting the connection release message may be based on the received bearer modification response message.

In some examples of the method, apparatuses, and non-transitory computer-readable medium described herein, the bearer modification request message includes an indication of a set of suspended data radio bearers and a set of non-suspended data radio bearers, the set of non-suspended data radio bearers including the at least one data radio bearer, and the bearer modification response message includes an indication of the set of routing identifiers and a set of data radio bearer identifiers associated with the set of routing identifiers.

Some examples of the method, apparatuses, and non-transitory computer-readable medium described herein may further include operations, features, means, or instructions for determining, for the UE, a set of data radio bearers including the at least one data radio bearer for use in an inactive state of the UE, and identifying a routing identifier of the set of routing identifiers associated with the data radio bearer, where transmitting the connection release message may be based on identifying the set of routing identifiers.

Some examples of the method, apparatuses, and non-transitory computer-readable medium described herein may further include operations, features, means, or instructions for receiving, from the third network node, an indication of downlink data for the UE transmitted from the third network node, and transmitting, to the first network node based on receiving the indication of the downlink data, paging information to the first network node.

Some examples of the method, apparatuses, and non-transitory computer-readable medium described herein may further include operations, features, means, or instructions for receiving, from the third network node, an indication of uplink data from the UE, the uplink data transmitted from the first network node to the third network node.

DETAILED DESCRIPTION

Figure 1:
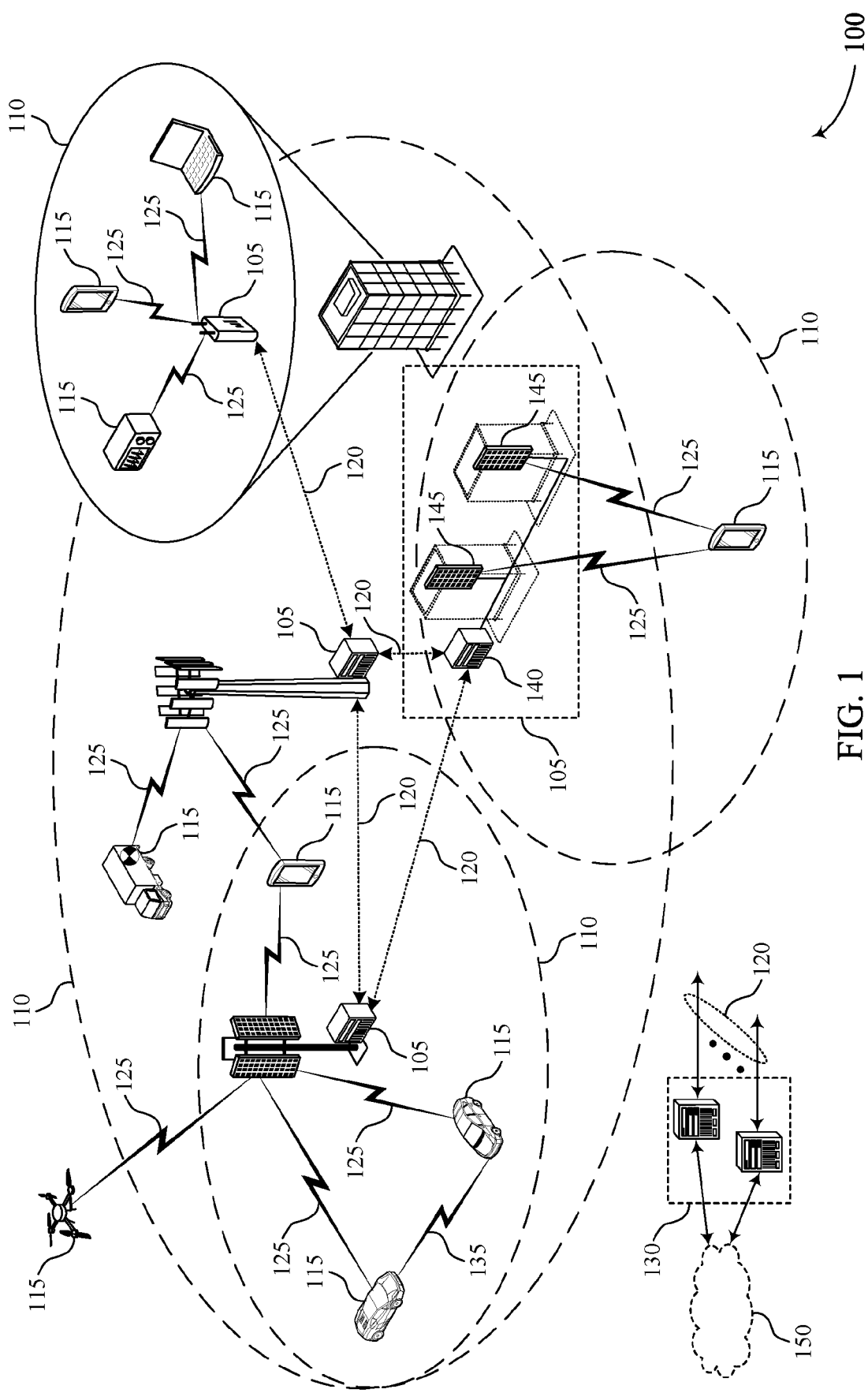
FIG. 1 illustrates an example of a system for wireless communications that supports small data transmissions in an inactive state to disaggregated base stations in accordance with aspects of the present disclosure.

In some wireless communications systems, a user equipment (UE) in an inactive state (a radio resource control (RRC) inactive state) may identify small amounts of data for transmissions. Such small data transmissions may be infrequent or unexpected (e.g. traffic from Instant Messaging services, push notifications, or traffic from wearables). To transmit the uplink data, the UE may perform a random access procedure (e.g., a random access channel (RACH) procedure) and establish a new RRC connection with the network (e.g., enter an RRC connected state). However, infrequently performing random access procedures to enter an RRC connected state for each small data transmission may result in unnecessary signaling overhead, timing delays and system latency, and excessive expenditure of computational resources.

In some examples, the UE may be mobile (e.g. a cell phone, wearable device, laptop, or the like) which may complicate small data transmission techniques. For example, the UE may be connected to a first network node (e.g., a distributed unit (DU)) of a disaggregated base station. The disaggregated base station may include a central unit user plane (CU-UP), a central unit control plan (CU-CP), and one or more DUs. The UE may enter an RRC inactive state by receiving an RRC release message from the first network node (e.g., an anchor DU). Sometime later, the UE may be located outside the coverage of the first network node, and may identify a small amount of data for transmission to the base station. However, the UE may be within the overage are of a second network node (e.g., a second DU) different from the anchor DU. As a result, the UE may be unable to communicate with the network via the different DU (e.g., in an RRC inactive state), and may not be able to the transmit the data.

In some examples, a UE may send small or infrequent data transmissions to a disaggregated base station while in an inactive state (e.g., an RRC inactive state). For example, the UE may directly send small data to a disaggregated base station without performing a random access procedure. In such examples, the CU-UP of the disaggregated base station may determine, independently or by communicating with the CU-UP of the disaggregated base station, a set of data resource bearer (DRBs), to remain unsuspended for the UE in an inactive state. The CU-CP may provide this information to a DU (e.g., an anchor DU), and the DU may transmit a connection release message (e.g. RRC release message) to the UE. The connection release message may include a list of routing identifiers and a list of DRB identifiers for each of the unsuspended DRBs determined by the CU-CP. In some examples, the connection release message may also include a downlink monitoring timer. The UE may use the routing identifiers and DRB identifiers to transmit small data in an RRC inactive state. For example, (e.g., where the UE has moved during the RRC inactive state to a different DU associated with a different CU-UP), the UE may identify data for an uplink transmission and a DRB associated with that data. The UE may transmit a small data packet with the data (e.g., as a sub protocol data unit (PDU) of a medium access control (MAC) protocol data unit (PDU)), and may indicate the routing identifiers (e.g., in a MAC control element (CE) of the same MAC PDU) to the DU.

In some examples, the UE may begin monitoring for downlink data (e.g., in response to the uplink data transmissions) during a window (e.g., a downlink monitoring window) indicated by the downlink monitoring timer. For instance, upon transmitting the uplink data, the UE may initiate the downlink monitoring timer (e.g., in a next transmission time interval (TTI) after transmitting the uplink data). The UE may monitor for downlink transmissions from the DU for the duration of the downlink monitoring window. This may allow the DU, when necessary, to forward paging information, downlink data, or both, to the UE, without waiting for a previously scheduled monitoring occasion (e.g., a paging monitoring occasion).

In some examples, the DU may decode the PDU message and may determine address information from the routing identifiers. The address information may include a transport network layer (TNL) address, a tunnel endpoint identifier, or the like. Based on the address information, the DU may forward the data package to CU-UP as a packet data convergence protocol (PDCP) PDU. The CU-UP may process the data. In some examples, the CU-UP may transmit, to the CU-CP, an indication of the uplink data. IN some examples, the CU-UP may send the data to the core network for further processing or to initiate a downlink data transmission in response to the uplink data. In some examples, the CU-UP may determine whether to initiate a new connection with the UE. In such examples, the CU-UP may transmit a downlink data notification to the CU-CP, which may send paging information to the DU for forwarding to the UE (e.g., during the downlink monitoring window). A subsequent connection may be established with the appropriate CU-UP (e.g., an access disaggregated base station corresponding to the location of the UE, which may be different than the previous anchor base station).

Particular aspects of the subject matter described herein may be implemented to realize one or more advantages. The described techniques may support improvements in system efficiency such that a device may avoid expensive overhead signaling and connection procedures for transmitting small data transmissions in an inactive state. It may also allow a UE to save power, reserve computational resources, and avoid increased delays and system latency, resulting in improved user experience. Additionally, a mobile UE may be able to transmit uplink data in a disconnected state even if it is physical located away from an anchor base station. Data transmissions can thus be made without a base station relocation procedure in many cases. As such, supported techniques may include improved network operations and, in some examples, may promote device and network efficiencies, among other benefits.

Aspects of the disclosure are initially described in the context of wireless communications systems and process flows. Aspects of the disclosure are further illustrated by and described with reference to apparatus diagrams, system diagrams, and flowcharts that relate to small data transmissions in an inactive state to disaggregated base stations.

FIG. 1 illustrates an example of a wireless communications system 100 that supports small data transmissions in an inactive state to disaggregated base stations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may send small or infrequent data transmissions to a disaggregated base station 105 while in an inactive state. The UE 115 may directly send small data to a disaggregated base station without performing a random access procedure. In such examples, a CU-UP of the disaggregated base station 105 may determine, independently or by communicating with the CU-UP of the disaggregated base station, a set of DRBs to remain unsuspended for the UE 115 in an inactive state. The CU-CP may provide this information to DU (e.g., an anchor DU), and the DU may transmit a connection release message (e.g., an RRC release message) to the UE 115. The connection release message may include a list of routing identifiers and a list of DRB identifiers for each of the unsuspended DRBs determined by the CU-CP. In some examples, the connection release message may also include a downlink monitoring timer. The UE 115 may use the routing identifiers and DRB identifiers to transmit small data in an RRC inactive state. For example, (e.g., where the UE 115 has moved during the RRC inactive state to a different DU associated with a different CU-UP), the UE 115 may identify data for an uplink transmission and a DRB associated with that data. The UE 115 may transmit a small data packet with the data (e.g., as a sub PDU of a MAC PDU), and may indicate the routing identifiers (e.g., in a MAC CE of the same MAC PDU to the DU.

Figure 2:
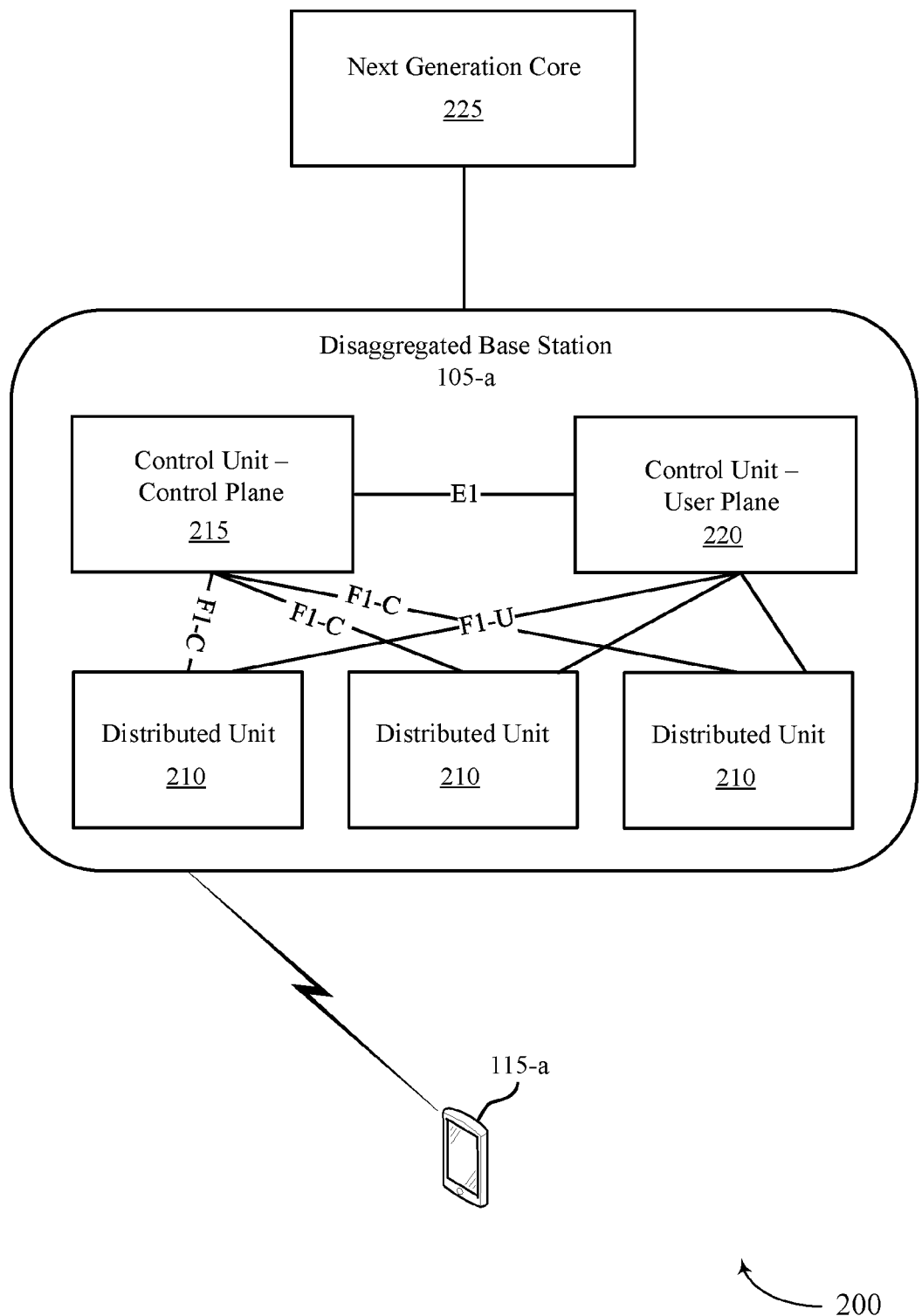
FIG. 2 illustrates an example of a wireless communications system that supports small data transmissions in an inactive state to disaggregated base stations in accordance with aspects of the present disclosure.

FIG. 2 illustrates an example of a wireless communications system 200 that supports small data transmissions in an inactive state to disaggregated base stations in accordance with aspects of the present disclosure. In some examples, wireless communications system 200 may implement aspects of wireless communications system 100. The wireless communications system 200 may include a base station 105-*a*, which may communicate with a core network (e.g., via a generation core (NGC) 225). In some examples, wireless communications system 200 may be considered a distributed implementation of a base station 105-*a*. The NGC 225 may be implemented at least partially in a network cloud. The NGC 225 may include an access and mobility function (AMF) and a user plane function (UPF).

The base station 105-*a* may include one or more control units (CUs). A CU may be a component of a gNB, such as the base station 105-*a*, that controls different cell groups that are part of or served by base station 105-*a*. For example, the base station 105-*a* of FIG. 2 may include a control unit control plane (CU-CP) 215 and two control unit user planes (CU-UPs) 220. In other examples, base station 105-*a* may include different numbers of CU-CPs 215 and CU-UPs 220. In some examples, the CU-CP 215 and a CU-UP 220 may be an example of running and controlling control plane functions for the gNB in the cloud.

The base station 105-*a* may also include one or more distributed units (DUs) 210. A DU 210 may be a functional network node of the base station 105-*a* that may perform a subset of the functions of base station 105-*a* based on functional split options. CU-CP 215 and the CU-UP 220 may control operations of a DU 210. In some examples, each DU 210 may be located in a different physical location, and each may be proximate to a radio proximate to a UE. The CU-CP 215 may control the control plane for the DUs 210 and the CU-UP 220 may control the user plane for the DUs 210. Each DU 210 may support carrier aggregation, so each DU 210 may have multiple carriers. In some example, the DUs 210 may be CCGs, NCCGs, or the like. One or more signal radio bearers (SRBs) may be split between DUs 210 (e.g., DUs that host the RLC entity of the SRB). SRBs may or may not be split on each DU 210. The CU-CP 215 and the CU-UP 220 may manage a broad area of DUs 210, but the SRB may be configured to be only split for the DUs with which the UE is most likely to communicate. In some examples, an SRB may be used to carry RRC information or other control information between the UE and the network, and a DRB may be used to carry user plane traffic.

UE 115-*a* may communicate with base station 105-*a* via a DU 210. This may mean that there are multiple RLC entities that run on the DUs 210. UE 115-*a* may learn of the configuration from the base station 105-*a*, which informs the UE of which DUs 210 are associated with the SRBs or DRBs.

In some examples, UE 115-*a* may identify data for transmission while operating in an RRC inactive mode, or an RRC idle mode. UE 115-*a* may receive an RRC release message from a DU 210, and may enter the RRC inactive mode based thereon. However, upon identifying data for uplink transmissions, UE 115-*a* may perform a random access procedure. For instance, UE 115-*a* may perform a two-step RACH procedure, a four-step RACH procedure, or the like. In some examples, a UE 115 (e.g., UE 115-*a*), may incorporate small amounts of data into a transmission that is a part of the random access procedure (e.g., MSGA of a two-step random access procedure, or a message 3 of a four-step random access procedure). In some examples, a UE 115-*a* may use flexile payload sizes to transmit a random access message including data. The size of such payloads may be configured by the network. In some examples, the UE 115-*a* may perform context fetching or data forwarding procedures (e.g., with or without an anchor base station relocation) in an inactive state for a random access based transmission procedure. In some examples, UE 115-*a* may transmit uplink data on pre-configured physical uplink shared channel (PUSCH) resources. For instance, UE 115-*a* may repurpose or reuse a configured grant for transmitting uplink data when a timing advance is valid.

When operating in an inactive state (e.g., a radio resource control (RRC) inactive state), UE 115-*a* may identify small amounts of data for transmissions. Such small data transmissions may be infrequency or unexpected (e.g. traffic from Instant Messaging services, push notifications, or traffic from wearables). Performing random access procedures and entering an active state, to transmit small amounts of data, may result in unnecessary signaling overhead, timing delays and system latency, and excessive expenditure of computational resources.

Additionally, UE 115-*a* may be mobile (e.g. a cell phone, wearable device, laptop, or the like) which may complicate small data transmission techniques. For example, UE 115-*a* may be connected to a first network node (e.g., a DU 210) of a disaggregated base station 105-*a*. UE 115-*a* may enter an RRC inactive state by receiving an RRC release message from the first DU 210. Sometime later, UE 115-*a* may be located outside the coverage of the DU 210, and may identify a small amount of data for transmission to base station 105-*a*. However, UE 115-*a* may be within the overage are of a second network node (e.g., a second DU 210) different from the anchor DU 210. As a result, UE 115-*a* may be unable to communicate with the network via the different DU 210 (e.g., in an RRC inactive state), and may not be able to the transmit the data.

Instead, UE 115-*a* may send small data transmissions to a DU 210, as described herein. For example, UE 115-*a* may receive additional information (e.g., one or more routing identifiers) included in an RRC release message. UE 115-*a* may transmit a PDU including the data and the routing identifiers (e.g., to another DU 210), so that the DU 210 can forward the data to the CU-UP, as described in greater detail with respect to FIGS. 3-5.

Figure 3:
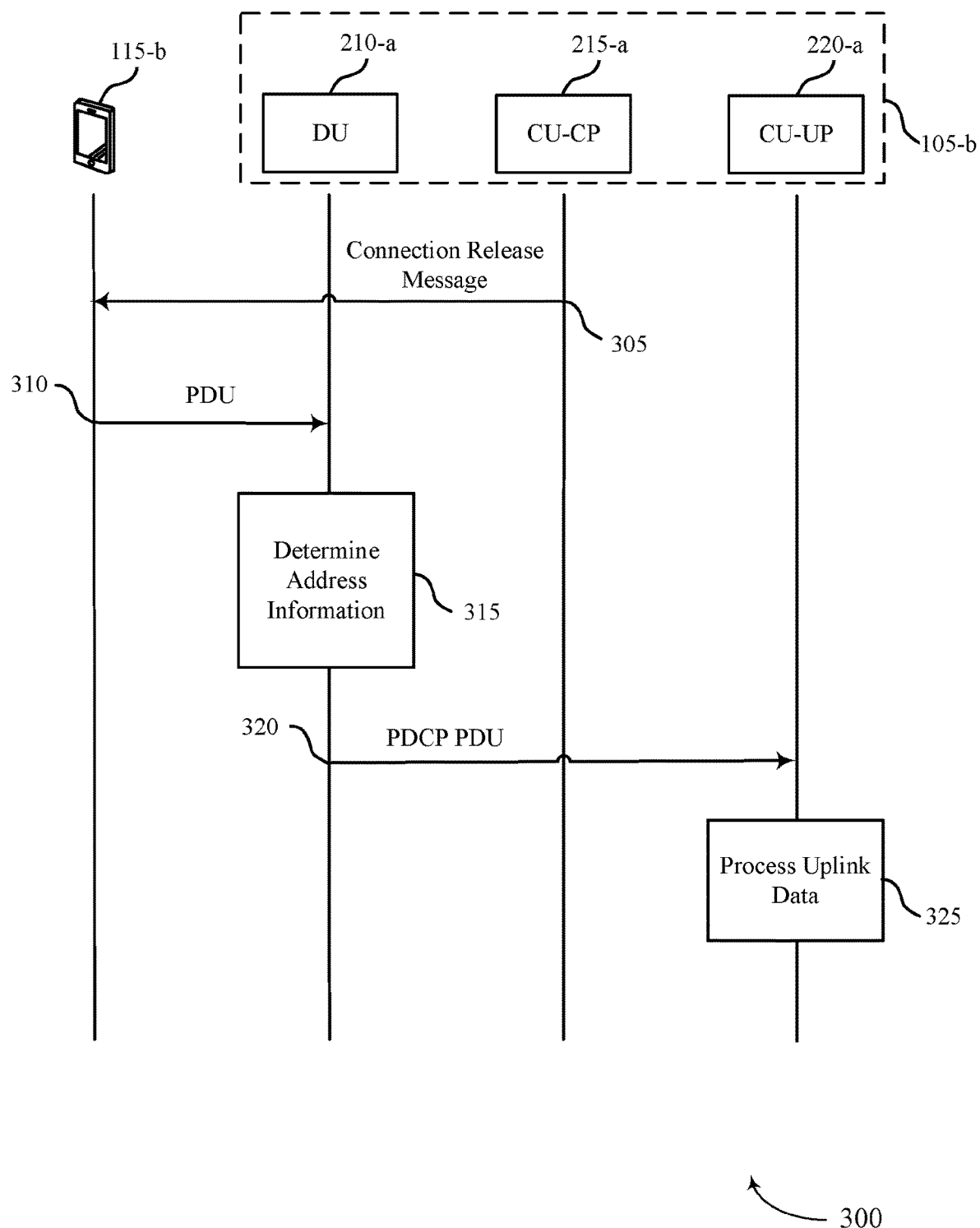
FIG. 3 illustrates an example of a process flow that supports small data transmissions in an inactive state to disaggregated base stations in accordance with aspects of the present disclosure.

FIG. 3 illustrates an example of a process flow 300 that supports small data transmissions in an inactive state to disaggregated base stations in accordance with aspects of the present disclosure. In some examples, process flow 300 may implement aspects of wireless communications systems 100 and 200. Process flow 300 may include a disaggregated base station 105-*b* including DU 210-*a*, CU-CP 215-*a*, CU-UP 220-*a*, and UE 115-*b*, which may be examples of the corresponding devices described with reference to FIGS. 1 and 2.

In some aspects, process flow 300 illustrates one example where UE 115-*b* may perform uplink data transmission to disaggregated base station 105-*a* while in an inactive state. In such examples, UE 115-*b* may successfully send small amounts of uplink data to a base station 105-*b* without performing an associated RRC procedure (e.g., without performing a random access procedure, entering an RRC active state, or the like). Thus, UE 115-*b* may be able to transmit data to a base station 105-*b* without having to perform a CU relocation procedure (e.g., connect to a different CU at a different disaggregated base station 105-*b* due to relocation of UE 115-*b*).

In some examples, prior to uplink data transmission, CU-CP 215-*a* may determine a set of routing identifiers (e.g., one routing identifier, or multiple routing identifiers) through communication with CU-UP 220-*a*, or independently (e.g., as described in greater detail with reference to FIG. 4). Each routing identifier may correspond to at least one DRB (e.g., a single routing identifier corresponding to a single DRB, or a set of routing identifiers corresponding to respective DRBs of a set of DRBs). That is, CU-CP 215 may identify a set of DRBs to be suspended upon a connection release (e.g., terminating an RRC connection), and may also determine a subset of DRBs to be excepted from the set of DRBs. The subset of DRBs may be maintained (e.g., not suspended) for communicating small amounts of data in an RRC inactive state, as described herein.

At 305, CU-CP 215-*a* may transmit, and UE-115-*b* may receive, a connection release message. The connection release message may be an RRC release message. The connection release message may instruct UE 115-*a* to release a wireless connection between UE 115-*b* and disaggregated base station 105-*a*. UE 115-*b* may enter the inactive state, based on having received the connection release message. The connection release message may include a set of one or more routing identifiers, and a set of one or more DRBs (e.g., the DRBs that have been excepted from suspension). In some examples, the connection release message may also include a downlink monitoring timer.

At 310, UE 115-*b* may transmit, and DU 315 may receive, a data packet. The data packet may be a protocol data unit (PDU). In some examples, UE 115-*b* may be located at the same place or near the same place it was located when it received the connection release message at 305. In such examples, UE 115-*b* may transmit the PDU at 310 to the same DU 210-*a*. In some examples, UE 115-*b* may have changed its location (e.g., may have been carried by its user to another location) from the time when it received the connection release message at 305. In such examples, UE 115-*b* may transmit the PDU at 310 to a different DU 210-*a*. Such a different DU 210-*a* may use the information in the PDU to forward the uplink data, even without having previous connection context for UE 115-*b* (e.g., based on a previous RRC connection) as described in greater detail with reference to FIG. 5. The PDU may consist of a sub PDU for carrying the uplink data, and a control element including at least one of the routing identifiers. In some examples, multiple DRBs may be supported (e.g., indicated in the connection release message). In such examples, and if the uplink data merits multiple sub PDUs, the PDU may include a set of sub PDUs, each sub PDU corresponding to a respective routing identifier. The PDU may be a medium access control (MAC) PDU, the PDU may be a MAC sub PDU or a MAC service data unit, and the CE may be a MAC CE. Having transmitted the PDU at 310, UE 115-*b* may initiate a downlink monitoring window for the duration of the downlink monitoring timer, as described in greater detail with reference to FIG. 4.

At 315, having received the PDU at 310, DU 210-*a* may process the PDU (e.g., may perform MAC processing and RLC processing, and may decode the PDU. Having decoded the PDU, DU 310-*a* may determine address information. For instance, DU 210-*a* may derive, based on the routing identifiers included in the PDU, address information for forwarding the received data to CU-UP 220-*a* at 320. Address information may include an uplink tunneling identifier (e.g., a tunnel endpoint identifier (TEID)), a transport network layer (TNL) address, or the like. DU 210-*a* may generate a General Packet Radio Service (GPRS) tunneling protocol, user plane (GTP-U) message, which may include the identified data in a PDCP PDU. DU 210-*a* may also include, in one or more fields of the GTP-U message, the derived address information.

At 320, DU 210-*a* may route the data packet from DU 210-*a* to CU-UP 220-*a* based on the preconfigured routing identifiers. That is, DU 210-*a* may transmit, and CU-UP 220-*a* may receive, the GTP-U message.

At 325, CU-UP 220-*a* may process the GTP-U message received from DU 210-*a*, and may utilize the address information to forward the uplink data to the network. In some examples, CU-UP 220-*a* may transmit the data to a core network and receive downlink data from the core network, as described in greater detail with reference to FIG. 4.

Thus, having received the routing identifiers in the connection release message, and provided such information in the PDU transmitted at 310, UE 115-*b* may be able to transmit uplink data in an RRC inactive state. Further, even if UE 115-*b* changes its location (e.g., a user is walking, driving, or otherwise moving) such that it transmits the PDU at 310 to a different DU 210 than the DU 210-*a* from which it received the connection release message at 305, the new DU 210-*a* will have the routing identifiers to determine the appropriate address information at 315. UE 115-*b* may also be capable of receiving downlink information without waiting for predefined or preconfigured monitoring occasions in an RRC inactive mode, as described in greater detail with reference to FIG. 4.

Figure 4:
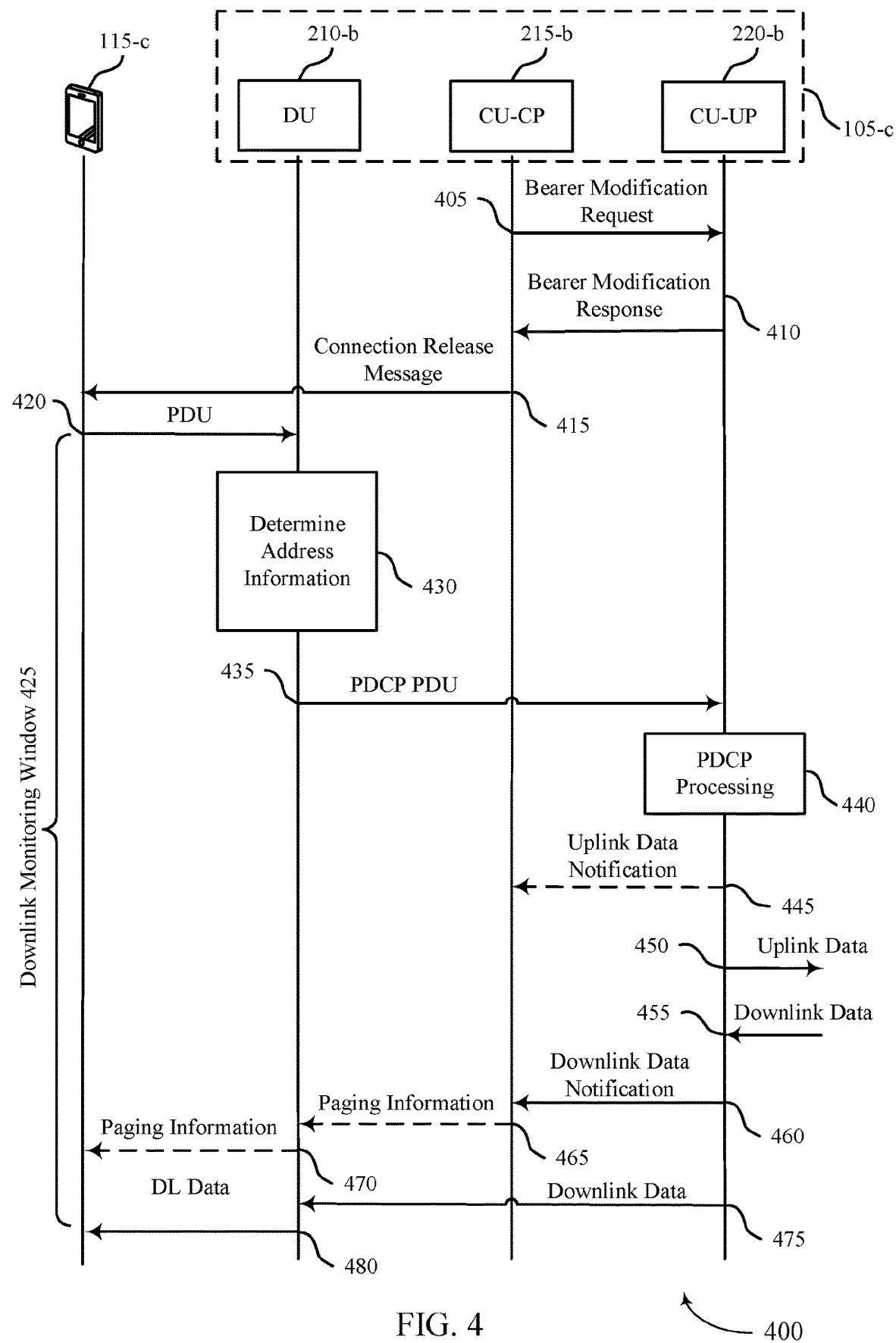
FIG. 4 illustrates an example of a process flow that supports small data transmissions in an inactive state to disaggregated base stations in accordance with aspects of the present disclosure.

FIG. 4 illustrates an example of a process flow 400 that supports small data transmissions in an inactive state to disaggregated base stations in accordance with aspects of the present disclosure. In some examples, process flow 400 may implement aspects of wireless communications system 100.

CU-CP 215-*b* may prepare to release an RRC connection with UE 115-*b*. However, CU-CP 215-*b* may derive one or more routing identifiers corresponding to one or more DRBs that are not to be suspended upon release the RRC connection. In some examples, CU-CP 215-*b* may independently derive the routing identifiers. For instance, CU-CP may identify locally based GTP-U tunnel address information for each DRB, and may derive routing identifiers for each DRB accordingly. In some examples, CU-CP 215-*b* may communicate with the CU-UP 220-*b* to derive the routing identifiers. For instance, at 405, CU-CP 215-*b* may transmit a bearer modification request message. The bearer modification request message may indicate a request to suspend communication with UE 115-*c*. However, the bearer modification request message may also indicate an exception of one or more DRBs from the request to suspend communications. That is, the bearer modification request message may request that some DRBs remain unsuspended for communications from UE 115-*c* in an RRC inactive state. In such examples, at 410, CU-UP 220-*b* may transmit a bearer modification response message to CU-CP 215-*b*. The bearer modification response message may include a list of DRB identifiers (e.g., of the unsuspended DRBs), and a list of routing identifiers corresponding to the DRB identifiers.

Having derived the list of routing identifiers (e.g., one or more routing identifiers), CU-CP 215-*b* may initiate an RRC connection release with UE 115-*c* at 415. CU-CP 215-*b* may provide a connection release message (e.g., an RRC connection release message) to DU 210-*b*, and DU 210-*d* may forward the connection release message to UE 115-*c*. The connection release message may include the list of routing identifiers, and corresponding DRB identifiers. In some examples, the connection release message may also include an indication of a downlink monitoring timer.

UE 115-*c* may receive the connection release message at 415, and may release its connection with base station 105-*c*. UE 115-*c* may, at 415, enter an RRC inactive state (e.g., or an RRC idle state, or the like). Subsequent to entering the RRC inactive state, UE 115-*c* may identify data for transmission to base station 105-*c*. The data may be small, and such small data transmissions may be infrequency or unpredictable.

At 420, UE 115-*c* may generate a PDU for transmitting the data to base station 105-*c*. The PDU may include one or more sub PDUs for transmitting the data. UE 115-*c* may also include one or more routing identifiers (e.g., one routing identifier for each sub PDU of the PDU) in a MAC CE of the PDU. DU 210-*b* may utilize the routing identifiers (preconfigured by CU-CP 215-*b* in the connection release message at 415) to forward the received uplink data to CU-UP 220-*b*. In some examples (e.g., where UE 115-*c* has not moved from the coverage area of the DU 210 from which it received the connection release message at 415) UE 115-*c* may transmit the PDU at 420 to the same DU 210 from which it received the connection release message. In some examples, (e.g., where UE 115-*c* has moved from the coverage area of the DU 210 from which it received the connection release message at 415), UE 115-*c* may transmit the PDU at 420 to a different DU 210-*b* than the DU 210 from which it received the connection release messages. In some examples, UE 115-*c* may determine DRBs associated with routing identifiers based on mapping provided during the previously released RRC connection.

In some example, upon transmitting the PDU at 420, UE 115-*c* may initiate a downlink monitoring window 425. For instance, during the TTI subsequent to transmitting the PDU (e.g., a next slot after 420), UE 115-*c* may initiate the downlink monitoring timer received in the connection release message. The timer may run for the duration of downlink monitoring window 425. While the timer runs (e.g., during downlink monitoring window 425), UE 115-*c* may monitor for downlink signaling from DU 210-*b* (e.g., downlink data, paging information, or the like). Upon expiration of the downlink monitoring timer (e.g., at the end of downlink monitoring window 425), UE 115-*c* may refrain from monitoring, except for preconfigured monitoring windows (e.g., paging monitoring occasions, etc.).

At 430, having received the PDU at 420, DU 210-*b* may determine address information for forwarding the data to CU-UP 220-*b*. If DU 210-*b* is the same DU that forwarded the connection release message at 415, then DU 210-*b* may already have some or all of the routing identifiers, and may not need the routing identifiers included in the PDU. However, if DU 210-*b* is a different DU 210 than the DU 210 that forwarded the connection release message to UE 115-*c* at 415, then DU 210-*b* may rely on the routing identifiers received in the PDU to determine where to forward the data at 435. DU 210-*b* may derive the GTP-U address information for forwarding the data based on the routing identifiers. The GTO-U address information may include a TEID, a TNL address, or the like. In some examples, a mapping between the GTP-U address information and the routing identifiers may be configured in a DNS server. Because DU 210-*b* is able to derive the address information based on the routing identifiers, anchor base station relocation may not be necessary, even where the access DU 210-*b* (e.g., the DU 210 having a coverage area in which the UE 115-*c* is located) is does not belong to the anchor base station 105-*c* (e.g., the base station 105 with which UE 115-*c* was previously connected), as described in greater detail with reference to FIG. 5. Even if a direct internet protocol (IP) connection is not available for a CU-UP 220-*b* that is not part of the anchor base station 105-*c*, data may be routed to the anchor CU-UP 220 by a CU-UP of an access DU 210. In some examples, RLC processing, MAC processing, or both, of the PDU may be based at least in part on a default processing configuration for uplink transmissions, downlink transmissions, or both.

At 435, UE 115-*c* may generate and transmit a GTP-U message, including a PDCP PDU carrying the data received in the PDU at 420 to CU-UP 220-*b*. The GTP-U message may also include the address information. For example, the GTP-U message may include a field for a downlink TEID, a downlink TNL address, or the like. This information may be used for providing downlink information to the UE 115-*b*. For example, the address information may indicate the DU 210-*b* that received the PDU at 420. Thus, downlink information from the network may be provided back to the DU 210-*b* for forwarding to the UE 115-*c* based on the address information.

At 440, CU-UP 220-*b* may process the PDCP PDU received at 435. At 445, in some examples, CU-UP 220-*b* may transmit an uplink data notification message to CU-CP 215-*b*. The uplink data notification message may indicate, to CU-CP 215-*b*, that DU 210-*b* has forwarded uplink data to CU-UP 220-*b* at 435. This may provide CU-CP 215-*b* relevant information, which may be utilized to determine whether to establish an RRC connection with UE 115-*c* based on the uplink data transmission, or any subsequent downlink data transmissions. CU-UP 220-*b* may transmit the uplink data notification prior to receiving downlink data at 450, or subsequent to it. In some examples, processing the PDCP PDU may be based on UE context, bearer context at CU-UP 220-*b*, or both. In some examples, security protections may be based on anchor CU-CP and anchor CU-UP security.

At 450, CU-UP 220-*b* may transmit the uplink data, received at 435, to the network. In some examples, in response to the uplink data, CU-UP 220-*b* may receive downlink data at 455. The downlink data may be response to the uplink data transmitted at 445. In some examples, the downlink data may be for UE 115-*c*.

At 460, CU-CP may transmit a downlink data notification to CU-CP 215-*b*. The downlink data notification may indicate pending downlink data, an amount of downlink data for transmission to UE 115-*c*, or the like.

CU-CP 215-*b* may determine whether to establish another RRC connection with UE 115-*c*. For example, CU-CP 215-*b* may determine whether to page UE 115-*c* to bring UE 115-*c* into an RRC connected or RRC active state based on receiving data notifications from CU-UP 220-*b* (e.g., the uplink data notification message at 445, the downlink data notification message at 460, or both). In some examples, CU-CP 215-*b* may also receive one or more downlink non-access stratum (NAS) PDUs, on which it may rely at least partially to determine whether to establish an RRC connection with UE 115-*c*. In some examples, the control network may indicate, to base station 105-*c*, whether to initiate an RRC procedure (e.g., in the downlink data notification or a different notification). CU-CP 215-*b* may determine whether to page UE 115-*c* based on any of the above described signaling, as well as one or more current procedures (e.g., whether a handover procedure, relocation procedure, security update, or the like, is pending or necessary for UE 115-*c*). Based on one or more of the above described inputs, CU-CP 215-*b* may determine whether to transmit paging information to DU 210-*b* for UE 115-*c*.

If CU-CP 215-*b* determines to page UE 115-*c*, then CU-CP 215-*b* may transmit paging information for UE 115-*c* to DU 210-*b* at 465. At 470, DU 210-*b* may forward the paging information to UE 115-*c*. In some examples, CU-CP 215-*b* may transmit the paging information to DU 210-*b* based on the address information. For instance, DU 210-*b* may include downlink address information in the GTP-U message transmitted at 435. CU-UP 220-*b* may include some or all of the address information in the uplink data notification message at 445, the downlink data notification at 460, or both. Based on the address information, CU-CP 215-*b* may identify DU 210-*b*, and may forward the paging information to DU 210-*b* based thereon at 465.

UE 115-*c* may receive the paging information at 470. In some examples, UE 115-*c* may be monitoring for downlink signaling, such as paging information, based on the downlink monitoring window 425. That is, having initiated the downlink monitoring timer after transmitting the PDU at 420, UE 115-*c* may monitor continuously for downlink signaling from DU 210-*b* for the duration of downlink monitoring window 425. In some examples, CU-CP 215-*b* may have configured the downlink monitoring timer to have the duration of downlink monitoring window 425. If DU 210-*b* receives the paging information (or the downlink data at 475) prior to expiration of downlink monitoring window 425, then DU 210-*b* may forward the paging information to UE 115-*c* immediately, instead of waiting for a paging monitoring occasion. Thus, UE 115-*c* may receive the paging information quickly, and be able to enter an RRC active or RRC connected state (e.g., for receiving downlink data). In some examples, establishing a new RRC connection with base station 105-*b* may include an anchor base station relocation procedure. However, by waiting until after transmitting the small data, UE 115-*c* may avoid unnecessary power expenditures for one or more small uplink data transmissions that may not result in an anchor base station relocation procedure.

At 475, CU-UP 220-*b* may provide downlink information for UE 115-*c* to DU 210-*b*. In some examples, DU 210-*b* may forward the downlink data to UE 115-*c* at 450. In some examples, before forwarding the downlink data to UE 115-*c*, UE 115-*c* and base station 105-*b* may perform and RRC connection procedure, based on the paging information received at 470. In some examples, depending on the amount of data for downlink transmission, DU 210-*b* may transmit the downlink data at 450 within downlink monitoring window 425.

Figure 5:
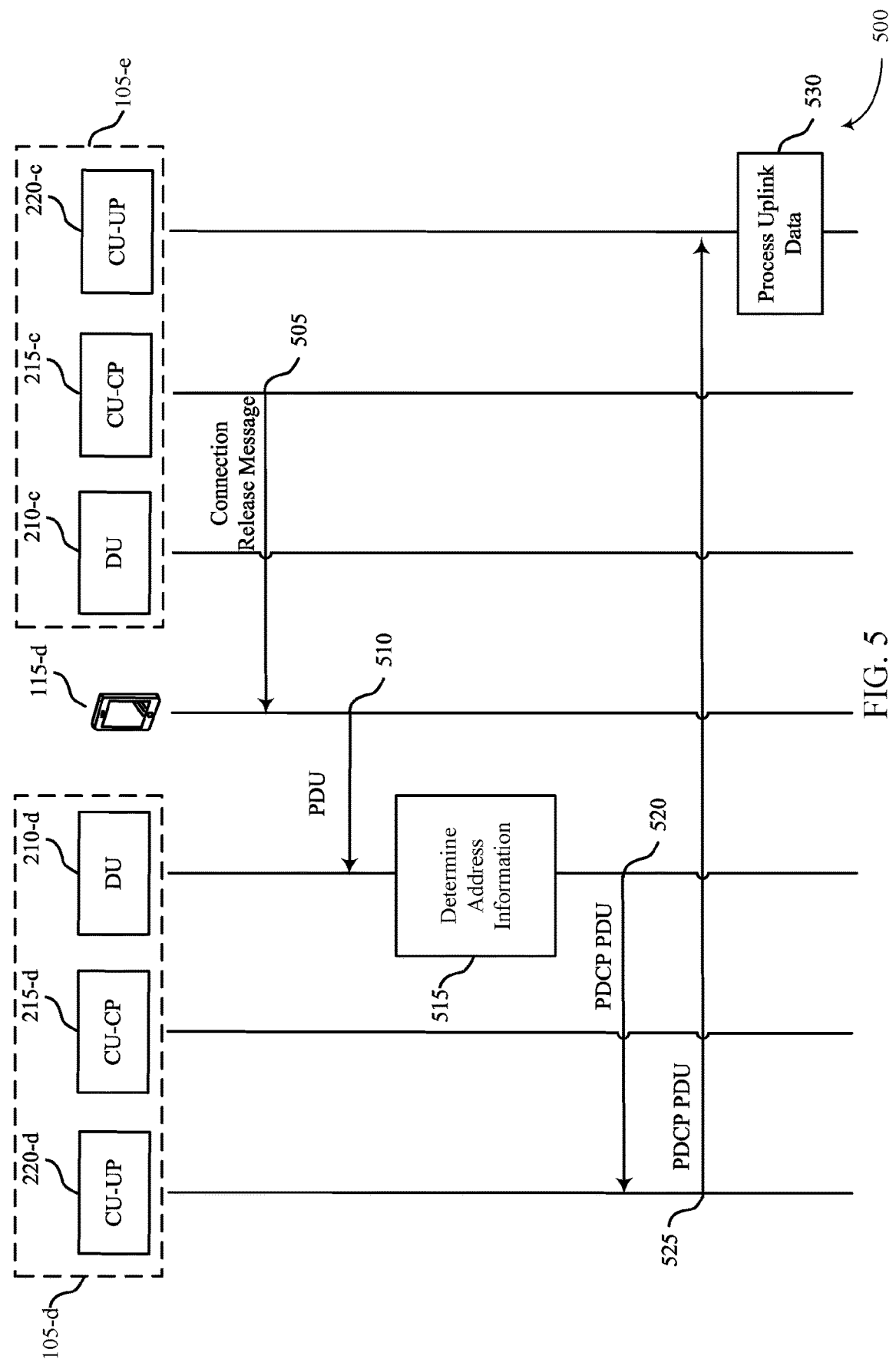
FIG. 5 illustrates an example of a process flow that supports small data transmissions in an inactive state to disaggregated base stations in accordance with aspects of the present disclosure.

FIG. 5 illustrates an example of a process flow 500 that supports small data transmissions in an inactive state to disaggregated base stations in accordance with aspects of the present disclosure. In some examples, process flow 500 may implement aspects of wireless communications systems 100 and 200. Process flow 500 may include a disaggregated base station 105-*e* including DU 210-*c*, CU-CP 215-*c*, and CU-UP 220-*c* and disaggregated base station 105-*d* including DU 210-*d*, CU-CP 215-*d*, and CU-UP 220-*d*, which may be examples of the corresponding devices described with reference to FIGS. 1-4.

UE 115-*d* may communicate with base station 105-*e* (e.g., may operate in an RRC connected mode). Disaggregated base station 105-*e* may be referred to as an anchor base station 105-*e*, and each network node (e.g., DU 210-*c*, CU-CP 215-*c*, CU-UP 220-*c*) may be referred to as an anchor network node. Anchor base station 105-*e* may have access to connection context information for UE 115-*d* during a connection, and after a connection is released (e.g., when UE 115-*d* enter an RRC inactive mode).

At 505, CU-CP 215-*c* may transmit, and UE 115-*d* may receive, a connection release message. The connection release message may be an RRC release message. The connection release message may instruct UE 115-*d* to release a wireless connection between UE 115-*d* and anchor base station 105-e. UE 115-d may enter the inactive state, based on having received the connection release message. The connection release message may include a set of one or more routing identifiers, and a set of one or more DRBs (e.g., the DRBs that have not been suspended despite the RRC inactive state). In some examples, the connection release message may also include a downlink monitoring timer.

After receiving the connection release message at 505, UE 115-d may move from a first location to a second location. At the first location, UE 115-d may be within the coverage area of anchor DU 210-c. However, a user may carry UE 115-d to the second location (e.g., the user may be walking, driving, or otherwise traveling). The second location may be outside of the coverage area of anchor DU 210-c. However, the second location may be within the coverage area of another DU 210-d. DU 210-d may be part of another disaggregated base station 105-d. Disaggregated base station 105-d may be referred to as an access base station 105-d, and each network node of access base station 105-d may be referred to as an access network node. Although access DU 210-d may not be part of anchor base station 105-e, UE 115-d may still be able to transmit uplink data in an RRC inactive state using techniques described herein.

At 510, UE 510 UE 115-d may transmit, and access DU 210-d may receive, a data packet. In other words, UE 115-d may transmit the data packet to a different DU 210-d from which it received the connection release message at 505. A sub PDU of the PDU may include the uplink data, and a CE of the PDU may indicate the routing identifiers received from DU 210-c. Thus, although access DU 210-d may not have previously communicated with UE 115-c, and although access base station 105-d may not have context information for UE 115-d (e.g., based on a previous RRC connection), DU 210-d may identify routing identifiers for the uplink data from the PDU transmitted at 510, and may forward the data on the access CU-UP 220-d. In some examples, multiple DRBs may be supported (e.g., indicated in the connection release message). In such examples, the PDU may include a set of sub PDUs, each sub PDU corresponding to a respective routing identifier. The PDU may be a medium access control (MAC) PDU, the PDU may be a MAC sub PDU or a MAC service data unit, and the CE may be a MAC CE. Having transmitted the PDU at 510, UE 115-d may initiate a downlink monitoring window for the duration of a downlink monitoring timer, as described in greater detail with reference to FIG. 4.

At 515, access DU 210-d may derive address information from the routing identifiers, as described in greater detail with reference to FIG. 4. In some examples, access DU 210-d may determine a mapping between the routing identifiers and the DRBs (e.g., based on previous mapping information, or information indicated by a DNS server). DU 210-d may forward the data to a CU-UP 220 (e.g., access CU-UP 220-d) based on the routing identifiers. Further, DU 210-d may derive downlink address information (e.g., a TEID and TSN address for downlink information) from the routing identifiers.

At 520, DU 210-d may transmit a PDCP PDU carrying the uplink data, with the address information, to access CU-UP 220-d. In some examples, CU-UP 220-d may forward the uplink data to the core network.

In some examples, at 525, CU-UP 220-d may forward the PDCP PDU to the anchor base station 105-e. CU-UP 220-d may transmit a GTP-U message, including the PDCP PDU and the address information, to anchor CU-UP 220-c. CU-UP 220-c may process the uplink data at 530. If Anchor base station 105-e determines to provide paging information to UE 115-d to trigger the UE 115-d to enter an RRC active state, then anchor base station 105-e may initiate paging for UE 115-d. In some examples, anchor base station 105-e may initiate an anchor relocation procedure, and access base station 105-d may become the new anchor base station, for establishing an RRC connection with UE 115-d.

Figure 6:
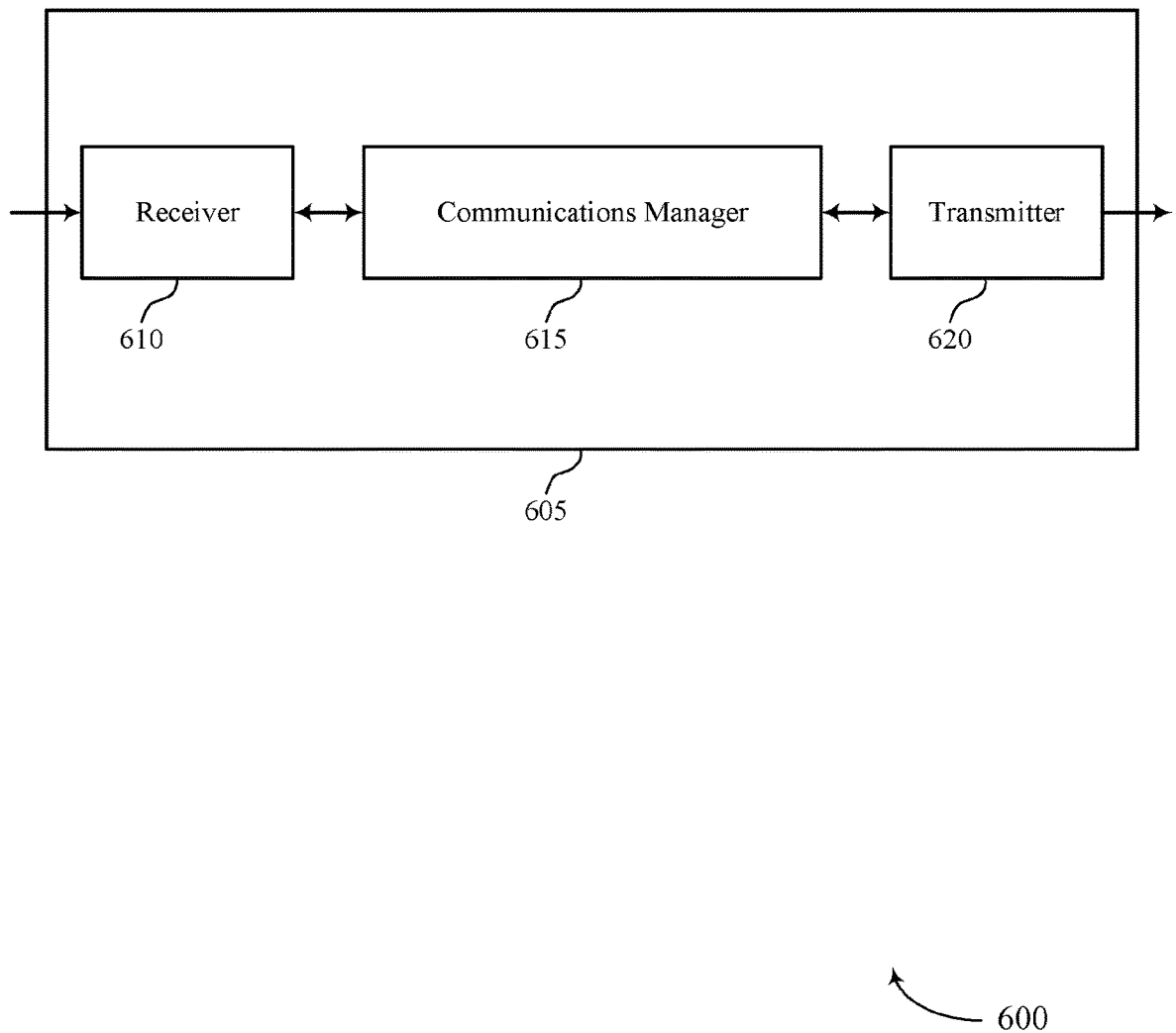
FIGS. 6 and 7 show block diagrams of devices that support small data transmissions in an inactive state to disaggregated base stations in accordance with aspects of the present disclosure.

FIG. 6 shows a block diagram 600 of a device 605 that supports small data transmissions in an inactive state to disaggregated base stations in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to small data transmissions in an inactive state to disaggregated base stations, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a first network node, a connection release message instructing the UE to enter an inactive state, the connection release message including a set of routing identifiers, each routing identifier of the set of routing identifiers associated with at least one data radio bearer, enter the inactive state based on receiving the connection release message, identify data to transmit in the inactive state of the UE and at least one routing identifier of the set of routing identifiers associated with the data, and transmit, in the inactive state, a packet including the identified data and the at least one routing identifier. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device to improve system efficiency such that a device may avoid expensive overhead signaling and connection procedures for transmitting small data transmissions in an inactive state. It may also allow a UE to save power, reserve computational resources, and avoid increased delays and system latency, resulting in improved user experience. Additionally, a mobile UE may be able to transmit uplink data in a disconnected state even if it is physical located away from an anchor base station. Data transmissions can thus be made without a base station relocation procedure in many cases. As such, supported techniques may include improved network operations and, in some examples, may promote device and network efficiencies, among other benefits.

Figure 9:
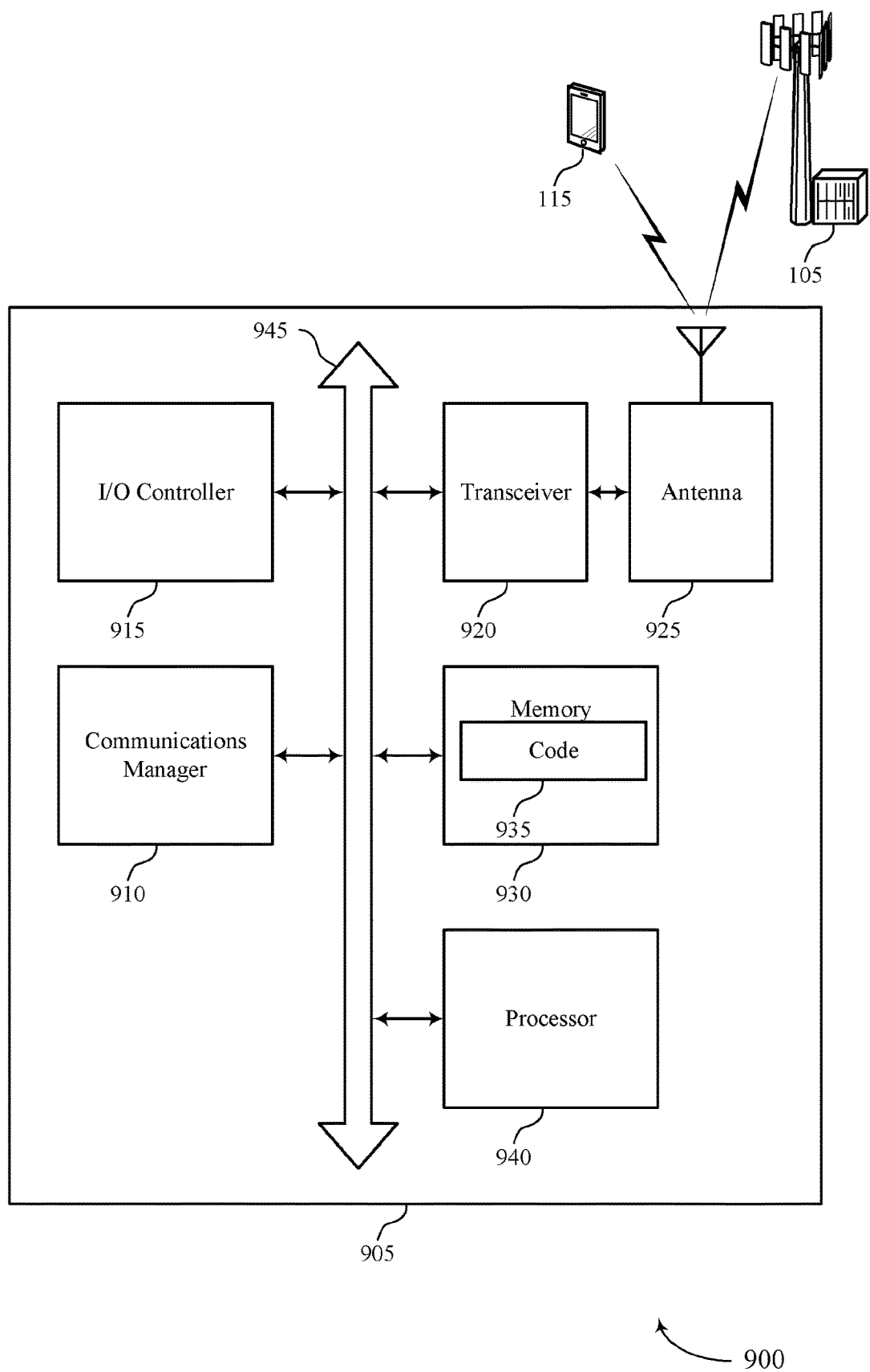
FIG. 9 shows a diagram of a system including a device that supports small data transmissions in an inactive state to disaggregated base stations in accordance with aspects of the present disclosure.

Based on techniques for efficiently communicating maximum number of layers for a device as described herein, a processor of a UE 115 (e.g., controlling the receiver 610, the transmitter 620, or a transceiver 920 as described with respect to FIG. 9) may increase system efficiency and decrease unnecessary processing at a device.

Figure 7:
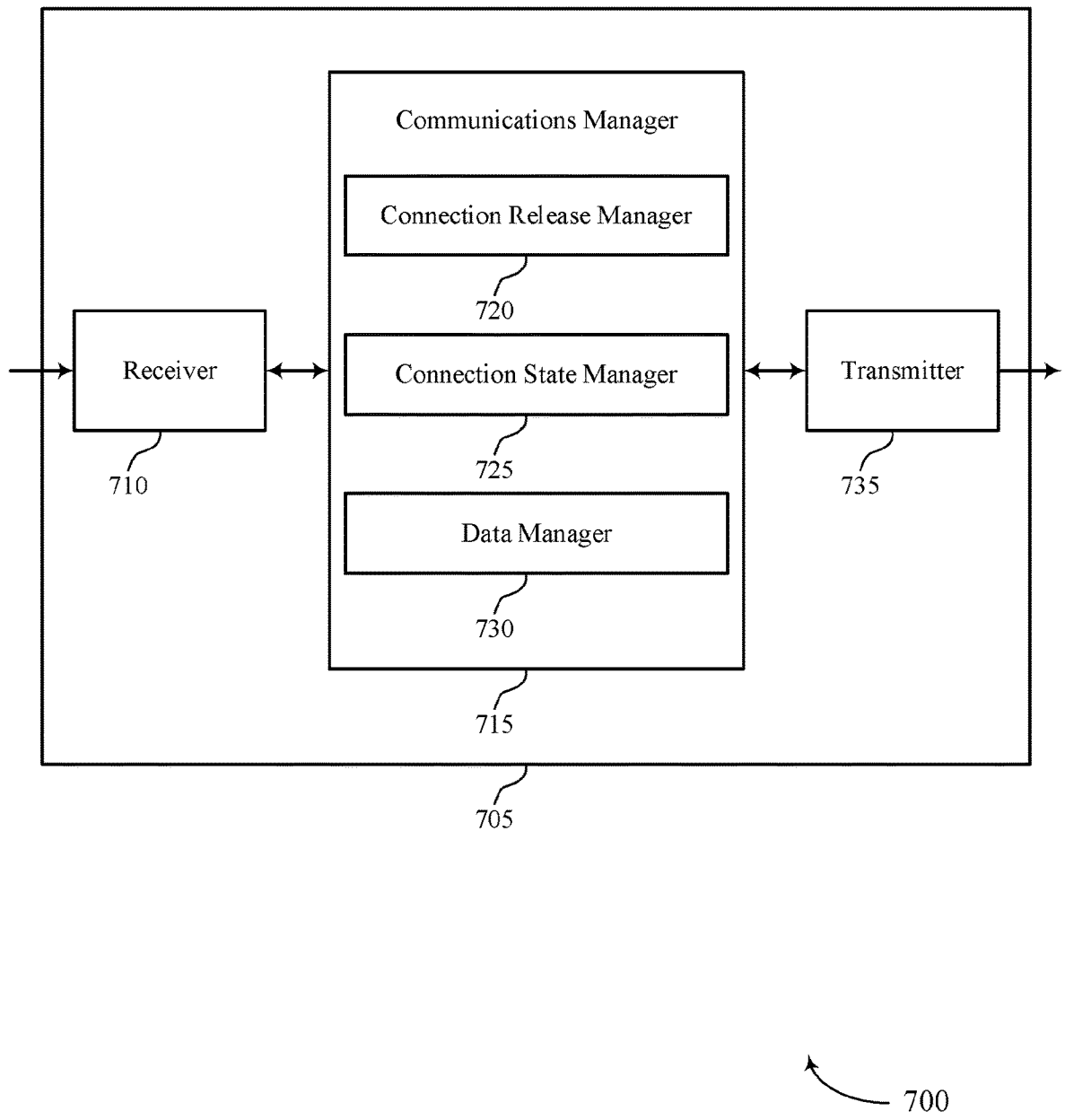

FIG. 7 shows a block diagram 700 of a device 705 that supports small data transmissions in an inactive state to disaggregated base stations in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to small data transmissions in an inactive state to disaggregated base stations, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a connection release manager 720, a connection state manager 725, and a data manager 730. The communications manager 715 may be an example of aspects of the communications manager 910 described herein.

The connection release manager 720 may receive, from a first network node, a connection release message instructing the UE to enter an inactive state, the connection release message including a set of routing identifiers, each routing identifier of the set of routing identifiers associated with at least one data radio bearer.

The connection state manager 725 may enter the inactive state based on receiving the connection release message.

The data manager 730 may identify data to transmit in the inactive state of the UE and at least one routing identifier of the set of routing identifiers associated with the data and transmit, in the inactive state, a packet including the identified data and the at least one routing identifier.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
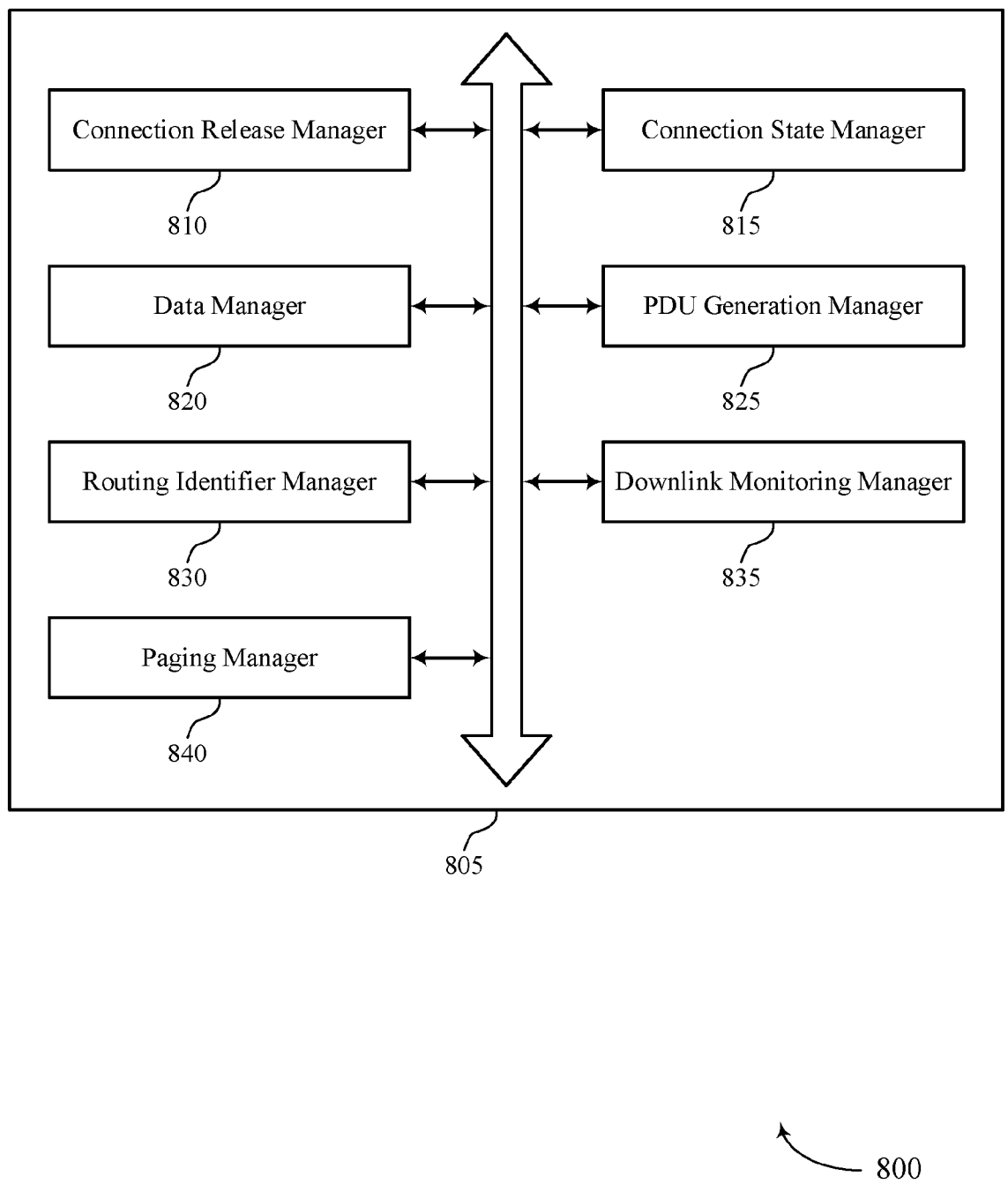
FIG. 8 shows a block diagram of a communications manager that supports small data transmissions in an inactive state to disaggregated base stations in accordance with aspects of the present disclosure.

FIG. 8 shows a block diagram 800 of a communications manager 805 that supports small data transmissions in an inactive state to disaggregated base stations in accordance with aspects of the present disclosure. The communications manager 805 may be an example of aspects of a communications manager 615, a communications manager 715, or a communications manager 910 described herein. The communications manager 805 may include a connection release manager 810, a connection state manager 815, a data manager 820, a PDU generation manager 825, a routing identifier manager 830, a downlink monitoring manager 835, and a paging manager 840. Each of these modules may communicate, directly or indirectly, with one another (e.g., via one or more buses).

The connection release manager 810 may receive, from a first network node, a connection release message instructing the UE to enter an inactive state, the connection release message including a set of routing identifiers, each routing identifier of the set of routing identifiers associated with at least one data radio bearer. In some cases, the connection release message includes a radio resource control release message. In some cases, a wireless connection between the UE and the first network node includes a radio resource control connection. In some cases, the inactive state includes a radio resource control inactive state.

The connection state manager 815 may enter the inactive state based on receiving the connection release message. In some cases, the first network node includes a distributed unit of a disaggregated base station, and the disaggregated base station includes one or more distributed units, a central unit control plane, and one or more central unit user planes.

The data manager 820 may identify data to transmit in the inactive state of the UE and at least one routing identifier of the set of routing identifiers associated with the data. In some examples, the data manager 820 may transmit, in the inactive state, a packet including the identified data and the at least one routing identifier. In some examples, the data manager 820 may transmit the packet to the first network node. In some examples, the data manager 820 may transmit the packet to an additional network node different than the first network node. In some examples, the data manager 820 may receive, from the additional network node based on transmitting the packet, downlink data.

The PDU generation manager 825 may generate a protocol data unit that includes a sub protocol data unit and a control element, the data unit including the identified data, and the control element including the at least one routing identifier, where transmitting the packet includes transmitting the generated protocol data unit.

In some examples, the PDU generation manager 825 may generate the protocol data unit that includes a set of sub protocol data units, the set of sub protocol data units including the sub protocol data unit, each sub protocol data unit of the set of sub protocol data units corresponding to a respective routing identifier of the set of routing identifiers. In some examples, the control element is a media access control control element. In some cases, the protocol data unit is a media access control protocol data unit. In some cases, the sub protocol data unit is a media access control sub protocol data unit or a media access control service data unit.

The routing identifier manager 830 may receive an indication of a mapping between the set of routing identifiers and a set of data radio bearers, each routing identifier mapped to at least one data radio bearer of the set of data radio bearers. In some examples, the routing identifier manager 830 may identify, from the set of data radio bearers, a data radio bearer associated with the data. In some examples, the routing identifier manager 830 may determine, based on the received indication of the mapping, the at least one routing identifier of the set of routing identifiers corresponding to the identified data radio bearer.

The downlink monitoring manager 835 may receive a downlink monitoring timer in the connection release message. In some examples, the downlink monitoring manager 835 may identify, based on the received downlink monitoring timer, a downlink monitoring window for the inactive state. In some examples, the downlink monitoring manager 835 may monitor, in the inactive state, for a downlink transmission during the downlink monitoring window.

The paging manager 840 may receive, based on the monitoring, a paging message. In some examples, the paging manager 840 may establish a wireless connection based on the received paging message.

FIG. 9 shows a diagram of a system 900 including a device 905 that supports small data transmissions in an inactive state to disaggregated base stations in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a first network node, a connection release message instructing the UE to enter an inactive state, the connection release message including a set of routing identifiers, each routing identifier of the set of routing identifiers associated with at least one data radio bearer, enter the inactive state based on receiving the connection release message, identify data to transmit in the inactive state of the UE and at least one routing identifier of the set of routing identifiers associated with the data, and transmit, in the inactive state, a packet including the identified data and the at least one routing identifier.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting small data transmissions in an inactive state to disaggregated base stations).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
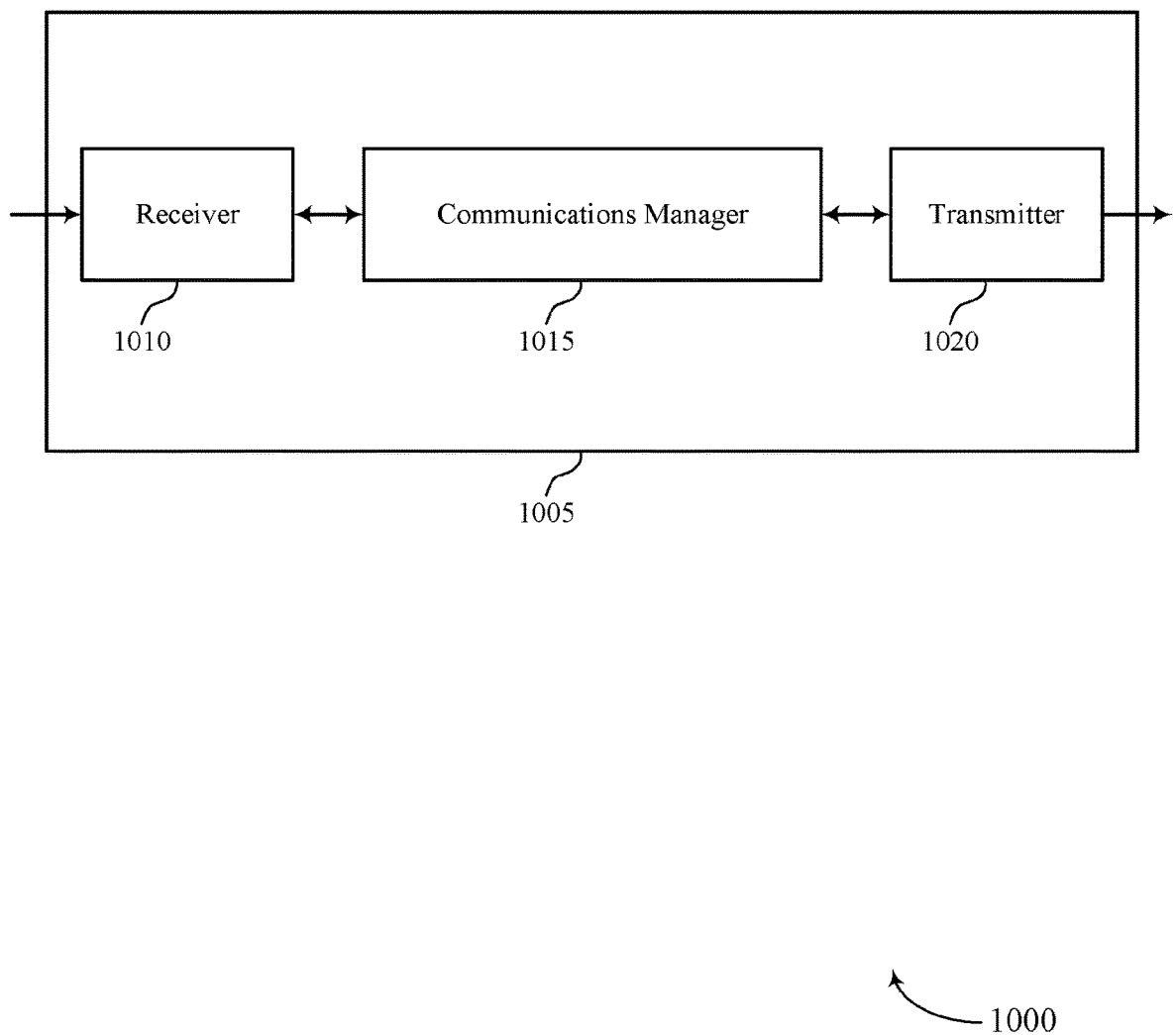
FIGS. 10 and 11 show block diagrams of devices that support small data transmissions in an inactive state to disaggregated base stations in accordance with aspects of the present disclosure.

FIG. 10 shows a block diagram 1000 of a device 1005 that supports small data transmissions in an inactive state to disaggregated base stations in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to small data transmissions in an inactive state to disaggregated base stations, etc.). Information may be passed on to other components of the device

1005. The receiver 1010 may be an example of aspects of the transceiver 1320 described with reference to FIG. 13. The receiver 1010 may utilize a single antenna or a set of antennas.

The communications manager 1015 may transmit, to a UE, a connection release message from a second network node instructing the UE to enter an inactive state, the connection release message including a set of routing identifiers, each routing identifier of the set of routing identifiers associated with at least one data radio bearer, receive, from the UE at least in part in response to the transmitted connection release message, a packet including data and at least one routing identifier of the set of routing identifiers, and transmit, to a third network node, the data based on the received at least one routing identifier. The communications manager 1015 may also transmit, to a first network node, a connection release message instructing a UE to enter an inactive state, the connection release message including a set of routing identifiers, each routing identifier of the set of routing identifiers associated with at least one data radio bearer and receive, from a third network node, an indication of data transmitted from the UE to the third network node at least in part in response to the transmitted connection release message. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
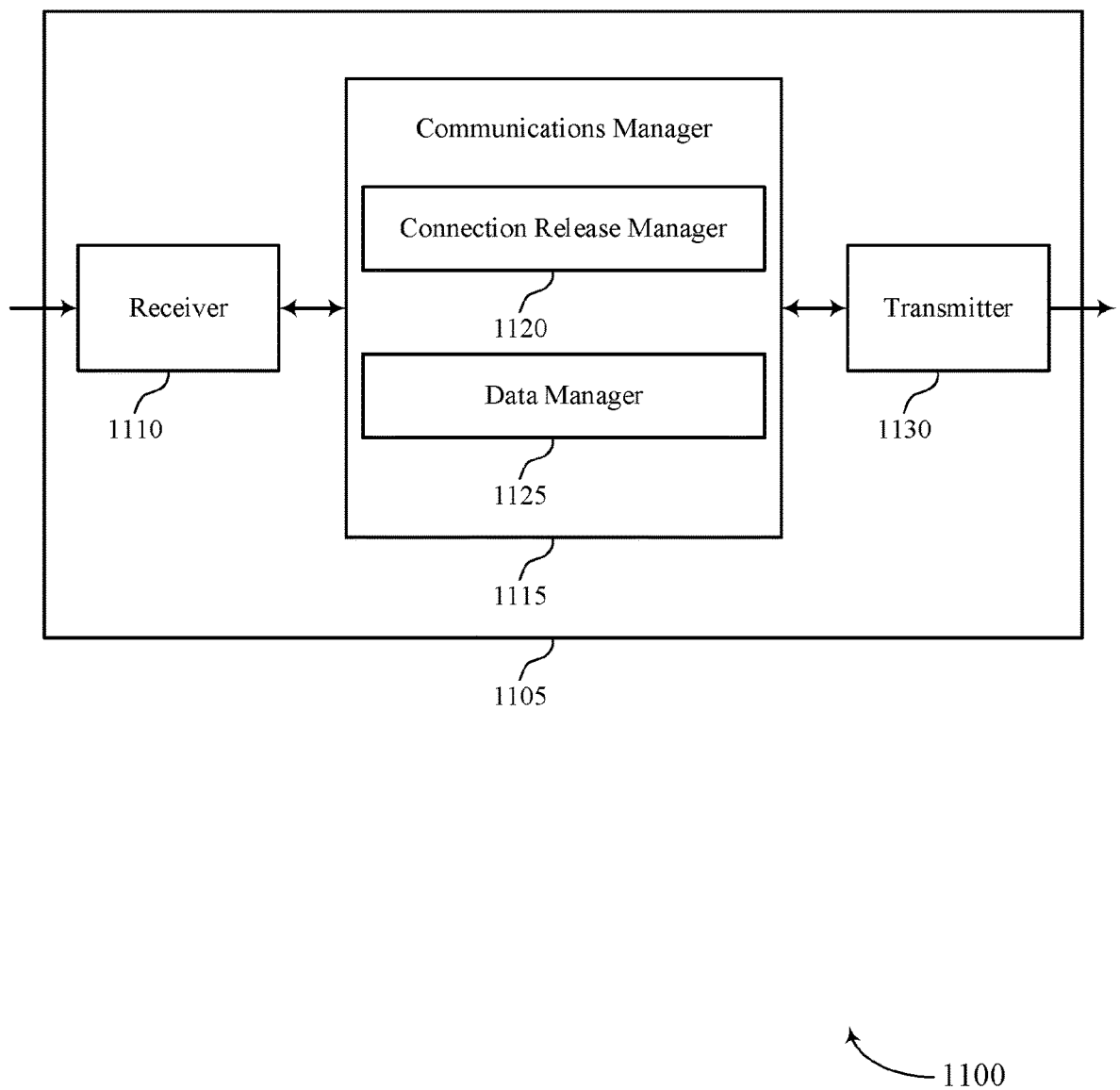

FIG. 11 shows a block diagram 1100 of a device 1105 that supports small data transmissions in an inactive state to disaggregated base stations in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to small data transmissions in an inactive state to disaggregated base stations, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a connection release manager 1120 and a data manager 1125. The communications manager 1115 may be an example of aspects of the communications manager 1310 described herein.

The connection release manager 1120 may transmit, to a UE, a connection release message from a second network node instructing the UE to enter an inactive state, the connection release message including a set of routing identifiers, each routing identifier of the set of routing identifiers associated with at least one data radio bearer.

The data manager 1125 may receive, from the UE at least in part in response to the transmitted connection release message, a packet including data and at least one routing identifier of the set of routing identifiers and transmit, to a third network node, the data based on the received at least one routing identifier.

The connection release manager 1120 may transmit, to a first network node, a connection release message instructing a UE to enter an inactive state, the connection release message including a set of routing identifiers, each routing identifier of the set of routing identifiers associated with at least one data radio bearer.

The data manager 1125 may receive, from a third network node, an indication of data transmitted from the UE to the third network node at least in part in response to the transmitted connection release message.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
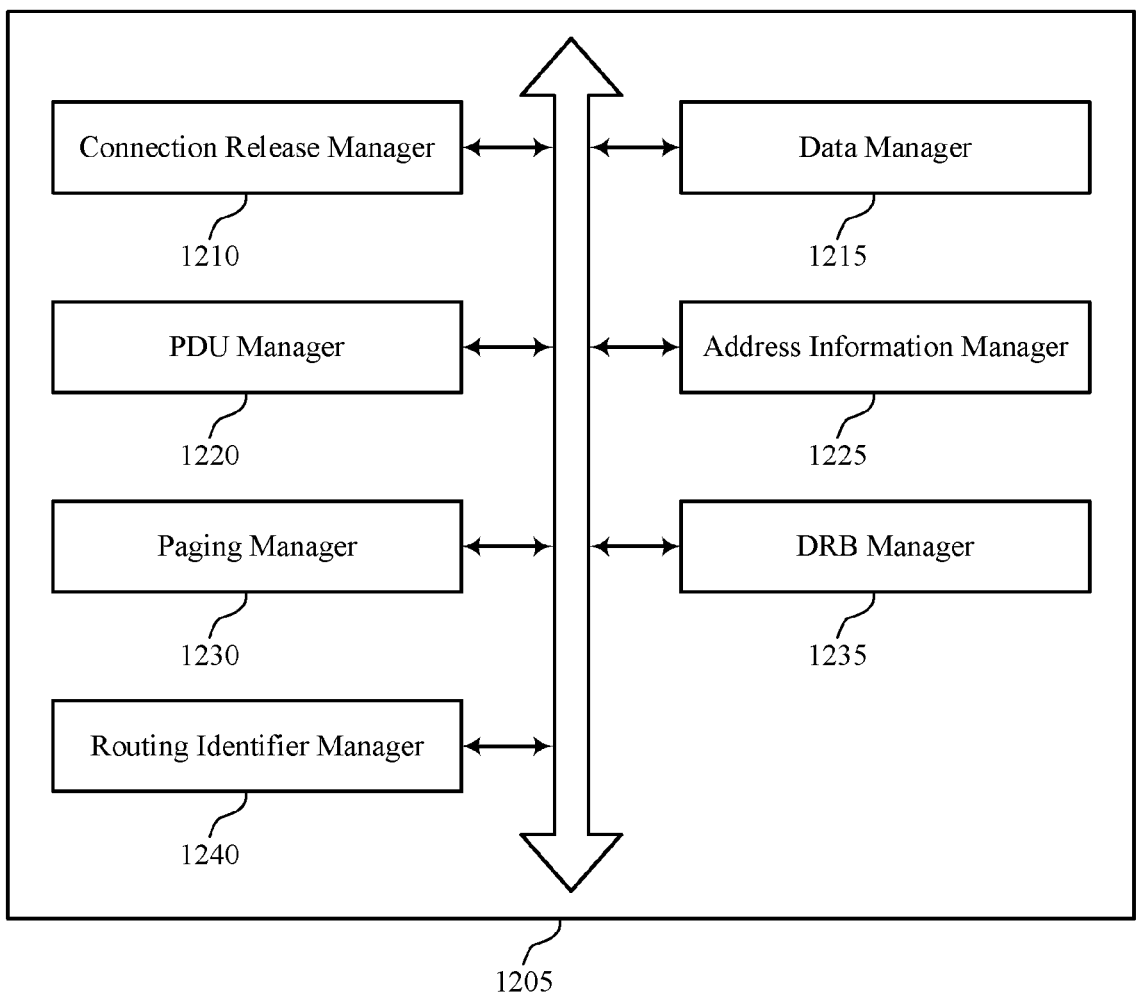
FIG. 12 shows a block diagram of a communications manager that supports small data transmissions in an inactive state to disaggregated base stations in accordance with aspects of the present disclosure.

FIG. 12 shows a block diagram 1200 of a communications manager 1205 that supports small data transmissions in an inactive state to disaggregated base stations in accordance with aspects of the present disclosure. The communications manager 1205 may be an example of aspects of a communications manager 1015, a communications manager 1115, or a communications manager 1310 described herein. The communications manager 1205 may include a connection release manager 1210, a data manager 1215, a PDU manager 1220, an address information manager 1225, a paging manager 1230, a DRB manager 1235, and a routing identifier manager 1240. Each of these modules may communicate, directly or indirectly, with one another (e.g., via one or more buses).

The connection release manager 1210 may transmit, to a UE, a connection release message from a second network node instructing the UE to enter an inactive state, the connection release message including a set of routing identifiers, each routing identifier of the set of routing identifiers associated with at least one data radio bearer.

In some examples, the connection release manager 1210 may transmit, to a first network node, a connection release message instructing a UE to enter an inactive state, the connection release message including a set of routing identifiers, each routing identifier of the set of routing identifiers associated with at least one data radio bearer.

The data manager 1215 may receive, from the UE at least in part in response to the transmitted connection release message, a packet including data and at least one routing identifier of the set of routing identifiers. In some examples, the data manager 1215 may transmit, to a third network node, the data based on the received at least one routing identifier.

In some examples, the data manager 1215 may receive, from a third network node, an indication of data transmitted from the UE to the third network node at least in part in response to the transmitted connection release message. In some examples, generating a packet data convergence protocol (PDCP) protocol data unit (PPDU), where transmitting the data includes transmitting the PPDU together with the address information.

In some examples, the data manager 1215 may receive, from the third network node, an indication of downlink data for the UE transmitted from the third network node. In some examples, the data manager 1215 may receive, from the third network node, an indication of uplink data from the UE, the uplink data transmitted from the first network node to the third network node. In some examples, the data manager 1215 may transmit, to the first network node based on receiving the indication of the downlink data, paging information to the first network node. In some cases, the first network node includes a distributed unit, where the second network node includes a control unit control plane, and where the third network node includes a control unit user plane. In some cases, the first network node includes a distributed unit, where the second network node includes a control unit control plane, and where the third network node includes a control unit user plan.

The PDU manager 1220 may receive a protocol data unit that includes a sub protocol data unit and a control element, the data unit including the identified data, and the control element including the at least one routing identifier, where transmitting the packet includes transmitting the generated protocol data unit.

In some examples, the control element is a media access control control element. In some cases, the protocol data unit includes a set of sub protocol data units, the set of sub protocol data units including the sub protocol data unit, and each sub protocol data unit of the set of sub protocol data units corresponds to a respective routing identifier of the set of routing identifiers.

In some cases, the protocol data unit is a media access control protocol data unit. In some cases, the sub protocol data unit is a media access control sub protocol data unit or a media access control service data unit.

The address information manager 1225 may determine, based on the at least one routing identifier, address information for the third network node, where transmitting the data to the third network node is based on the determined address information. In some cases, the address information includes an uplink tunneling identifier, a transport network layer address, or a combination thereof.

The paging manager 1230 may receive paging information from the second network node. In some examples, the paging manager 1230 may transmit, based on the at least one routing identifier, the paging information to the UE.

The DRB manager 1235 may transmit, to the third network node, a bearer modification request message. In some examples, the DRB manager 1235 may receive, from the third network node in response to the bearer modification request message, a bearer modification response message, where transmitting the connection release message is based on the received bearer modification response message.

In some examples, the DRB manager 1235 may determine, for the UE, a set of data radio bearers including the at least one data radio bearer for use in an inactive state of the UE. In some examples, the DRB manager 1235 may identify a routing identifier of the set of routing identifiers associated with the data radio bearer, where transmitting the connection release message is based on identifying the set of routing identifiers. In some cases, the bearer modification request message includes an indication of a set of suspended data radio bearers and a set of non-suspended data radio bearers, the set of non-suspended data radio bearers including the at least one data radio bearer.

The routing identifier manager 1240 may determine that the bearer modification response message includes an indication of the set of routing identifiers and a set of data radio bearer identifiers associated with the set of routing identifiers.

Figure 13:
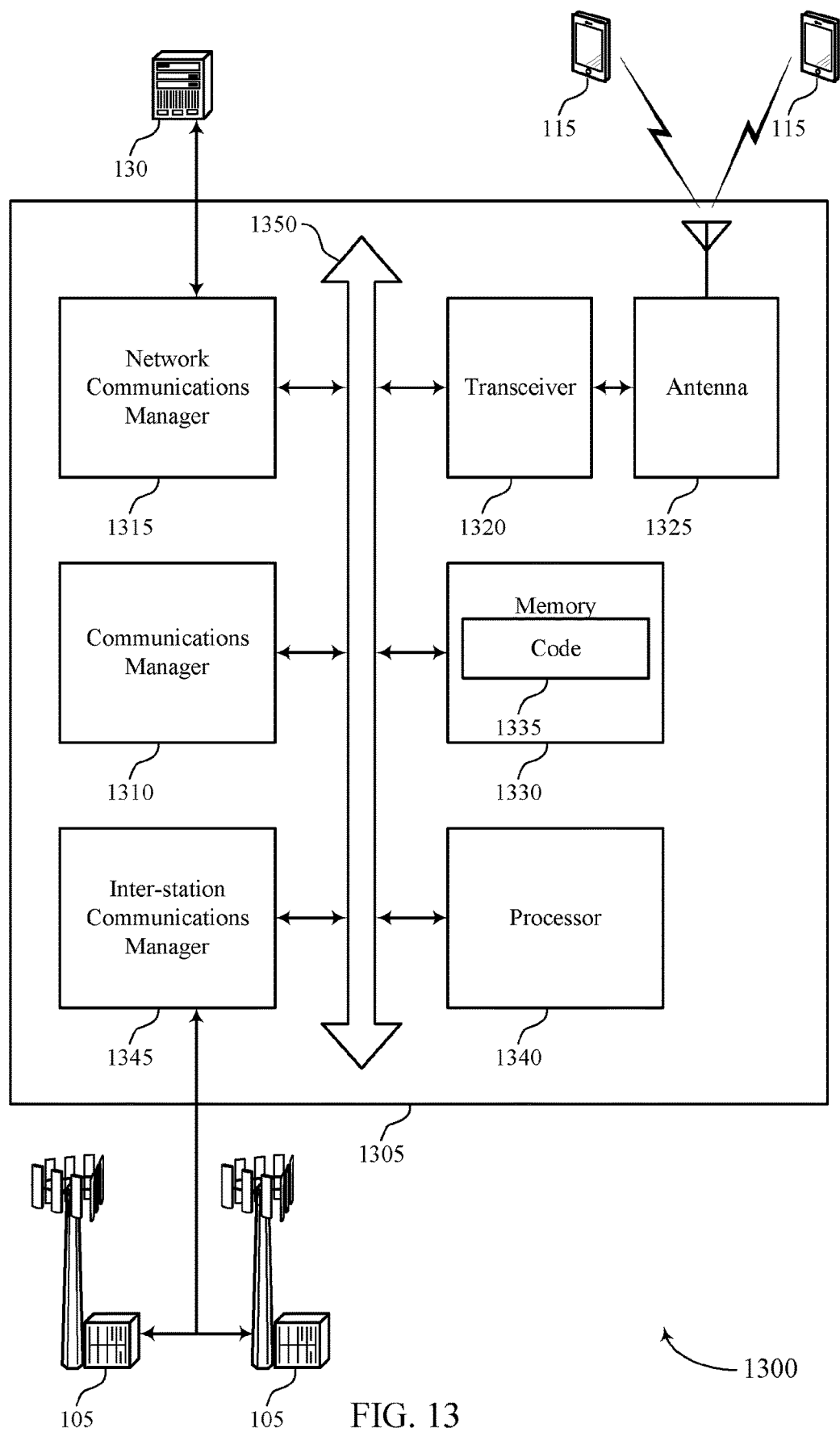
FIG. 13 shows a diagram of a system including a device that supports small data transmissions in an inactive state to disaggregated base stations in accordance with aspects of the present disclosure.

FIG. 13 shows a diagram of a system 1300 including a device 1305 that supports small data transmissions in an inactive state to disaggregated base stations in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, a connection release message from a second network node instructing the UE to enter an inactive state, the connection release message including a set of routing identifiers, each routing identifier of the set of routing identifiers associated with at least one data radio bearer, receive, from the UE at least in part in response to the transmitted connection release message, a packet including data and at least one routing identifier of the set of routing identifiers, and transmit, to a third network node, the data based on the received at least one routing identifier. The communications manager 1310 may also transmit, to a first network node, a connection release message instructing a UE to enter an inactive state, the connection release message including a set of routing identifiers, each routing identifier of the set of routing identifiers associated with at least one data radio bearer and receive, from a third network node, an indication of data transmitted from the UE to the third network node at least in part in response to the transmitted connection release message.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting small data transmissions in an inactive state to disaggregated base stations).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
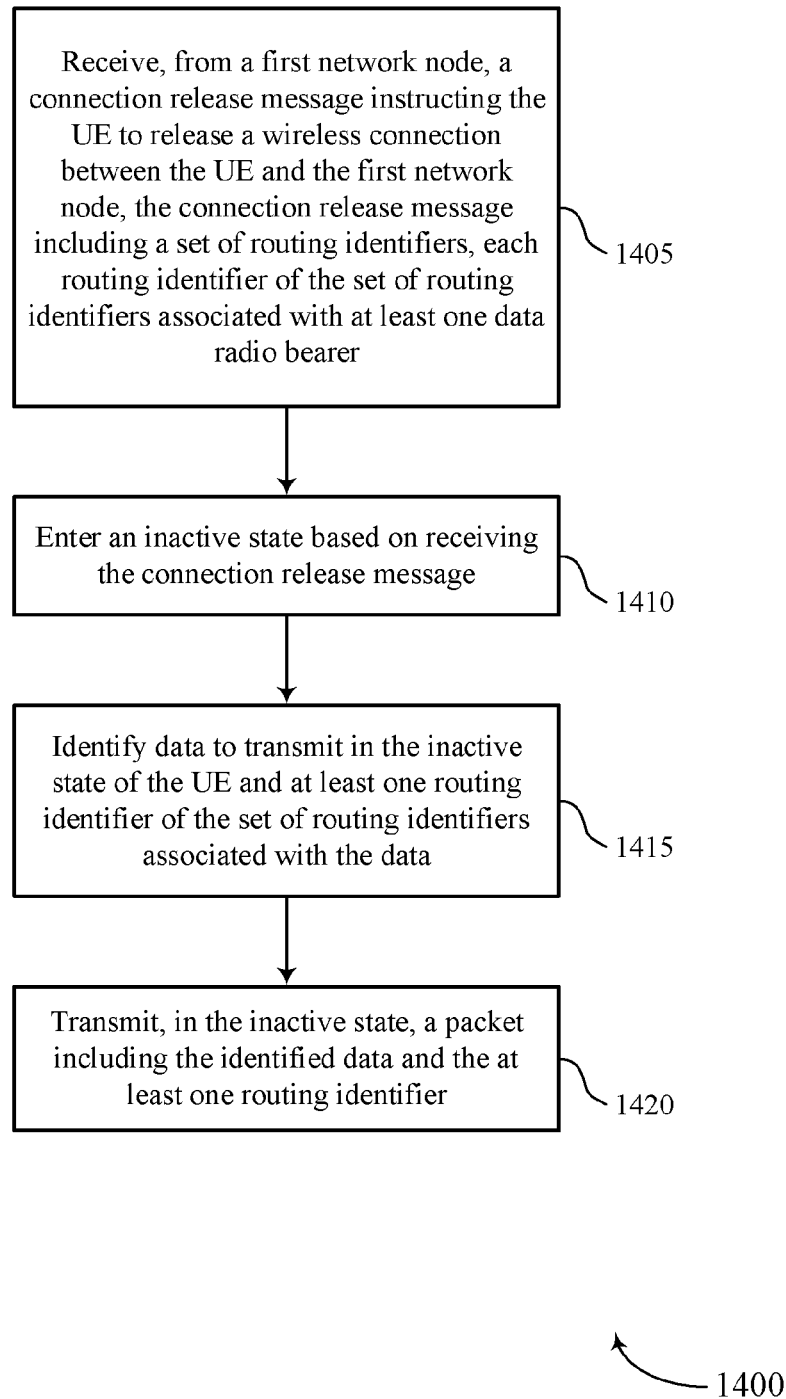
FIGS. 14 through 16 show flowcharts illustrating methods that support small data transmissions in an inactive state to disaggregated base stations in accordance with aspects of the present disclosure.

FIG. 14 shows a flowchart illustrating a method 1400 that supports small data transmissions in an inactive state to disaggregated base stations in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a first network node, a connection release message instructing the UE to enter an inactive state, the connection release message including a set of routing identifiers, each routing identifier of the set of routing identifiers associated with at least one data radio bearer. The operations of 1405 may be performed according to the methods described herein. In some examples, aspects of the operations of 1405 may be performed by a connection release manager as described with reference to FIGS. 6 through 9.

At 1410, the UE may enter the inactive state based on receiving the connection release message. The operations of 1410 may be performed according to the methods described herein. In some examples, aspects of the operations of 1410 may be performed by a connection state manager as described with reference to FIGS. 6 through 9.

At 1415, the UE may identify data to transmit in the inactive state of the UE and at least one routing identifier of the set of routing identifiers associated with the data. The operations of 1415 may be performed according to the methods described herein. In some examples, aspects of the operations of 1415 may be performed by a data manager as described with reference to FIGS. 6 through 9.

At 1420, the UE may transmit, in the inactive state, a packet including the identified data and the at least one routing identifier. The operations of 1420 may be performed according to the methods described herein. In some examples, aspects of the operations of 1420 may be performed by a data manager as described with reference to FIGS. 6 through 9.

Figure 15:
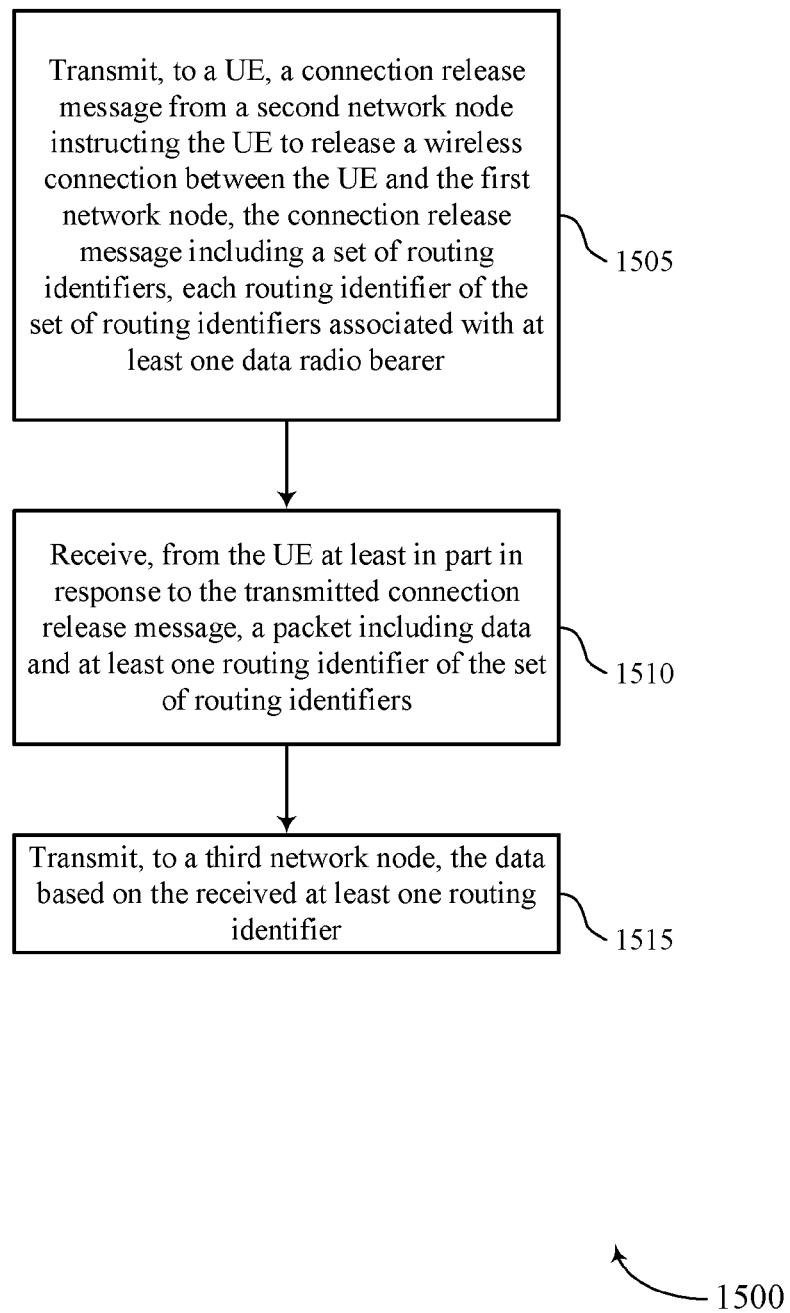

FIG. 15 shows a flowchart illustrating a method 1500 that supports small data transmissions in an inactive state to disaggregated base stations in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may transmit, to a UE, a connection release message from a second network node instructing the UE to enter an inactive state, the connection release message including a set of routing identifiers, each routing identifier of the set of routing identifiers associated with at least one data radio bearer. The operations of 1505 may be performed according to the methods described herein. In some examples, aspects of the operations of 1505 may be performed by a connection release manager as described with reference to FIGS. 10 through 13.

At 1510, the base station may receive, from the UE at least in part in response to the transmitted connection release message, a packet including data and at least one routing identifier of the set of routing identifiers. The operations of 1510 may be performed according to the methods described herein. In some examples, aspects of the operations of 1510 may be performed by a data manager as described with reference to FIGS. 10 through 13.

At 1515, the base station may transmit, to a third network node, the data based on the received at least one routing identifier. The operations of 1515 may be performed according to the methods described herein. In some examples, aspects of the operations of 1515 may be performed by a data manager as described with reference to FIGS. 10 through 13.

Figure 16:
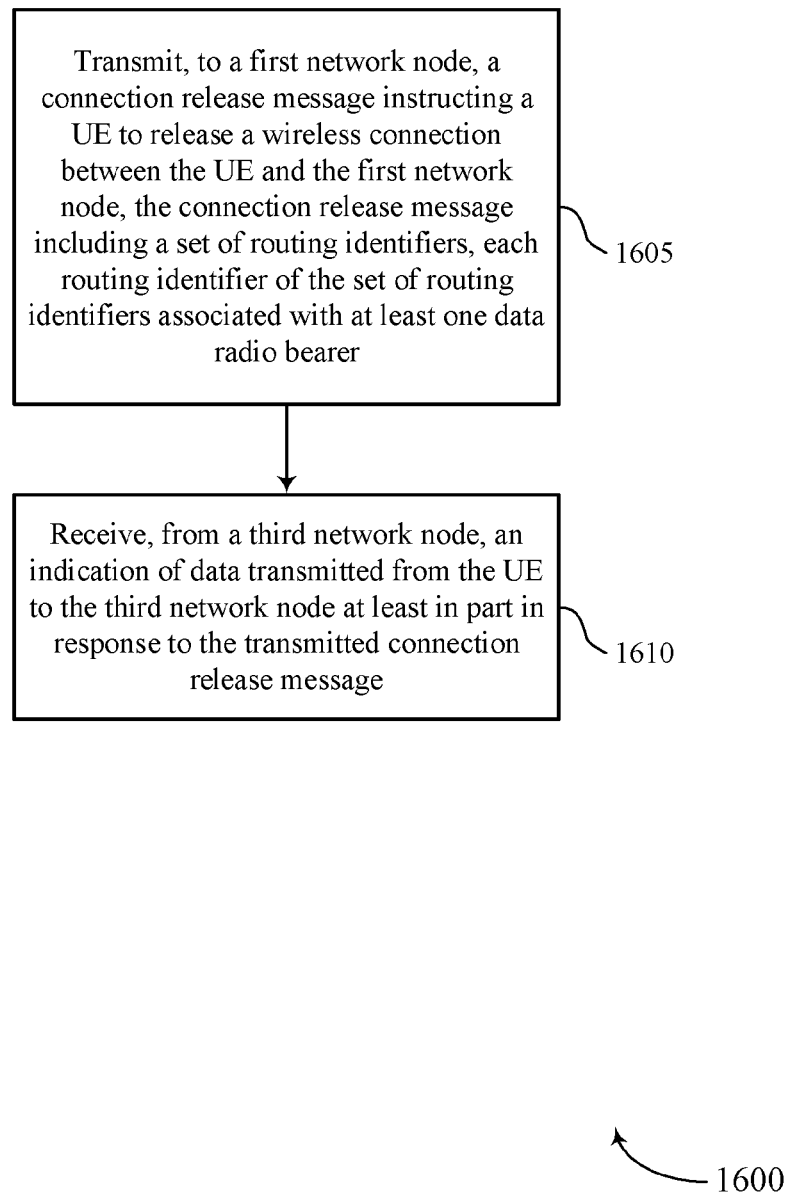

FIG. 16 shows a flowchart illustrating a method 1600 that supports small data transmissions in an inactive state to disaggregated base stations in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit, to a first network node, a connection release message instructing a UE to enter an inactive state, the connection release message including a set of routing identifiers, each routing identifier of the set of routing identifiers associated with at least one data radio bearer. The operations of 1605 may be performed according to the methods described herein. In some examples, aspects of the operations of 1605 may be performed by a connection release manager as described with reference to FIGS. 10 through 13.

At 1610, the base station may receive, from a third network node, an indication of data transmitted from the UE to the third network node at least in part in response to the transmitted connection release message. The operations of 1610 may be performed according to the methods described herein. In some examples, aspects of the operations of 1610 may be performed by a data manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a first network node, a connection release message instructing the UE to enter an inactive state, the connection release message including a set of routing identifiers, each routing identifier of the set of routing identifiers associated with at least one data radio bearer;
   entering the inactive state based at least in part on receiving the connection release message;
   identifying data to transmit in the inactive state of the UE and at least one routing identifier of the set of routing identifiers associated with the data; and
   transmitting, in the inactive state, a packet comprising the identified data and the at least one routing identifier.

2. The method of claim 1, further comprising:
   generating a protocol data unit that includes a sub protocol data unit and a control element, the data unit comprising the identified data, and the control element comprising the at least one routing identifier, wherein transmitting the packet comprises transmitting the generated protocol data unit.

3. The method of claim 2, wherein generating the media access control protocol data unit further comprises:
   generating the protocol data unit that includes a set of sub protocol data units, the set of sub protocol data units including the sub protocol data unit, each sub protocol data unit of the set of sub protocol data units corresponding to a respective routing identifier of the set of routing identifiers.

4. The method of claim 2, wherein:
   the protocol data unit comprises a media access control protocol data unit;
   the sub protocol data unit comprises a media access control sub protocol data unit or a media access control service data unit; and
   and the control element comprises a media access control control element.

5. The method of claim 1 further comprising:
   receiving an indication of a mapping between the set of routing identifiers and a set of data radio bearers, each routing identifier mapped to at least one data radio bearer of the set of data radio bearers;
   identifying, from the set of data radio bearers, a data radio bearer associated with the data; and
   determining, based at least in part on the received indication of the mapping, the at least one routing identifier of the set of routing identifiers corresponding to the identified data radio bearer.

6. The method of claim 1, wherein transmitting the packet comprises:
   transmitting the packet to the first network node.

7. The method of claim 1, wherein transmitting the packet comprises:
   transmitting the packet to an additional network node different than the first network node; and
   receiving, from the additional network node based at least in part on transmitting the packet, downlink data.

8. The method of claim 1, further comprising:
   receiving a downlink monitoring timer in the connection release message.

9. The method of claim 8, further comprising:
   identifying, based at least in part on the received downlink monitoring timer, a downlink monitoring window for the inactive state; and
   monitoring, in the inactive state, for a downlink transmission during the downlink monitoring window.

10. The method of claim 9, further comprising:
    receiving, based at least in part on the monitoring, a paging message; and
    establishing a wireless connection based at least in part on the received paging message.

11. The method of claim 1, wherein:
    the connection release message comprises a radio resource control release message;
    a wireless connection between the UE and the first network node comprises a radio resource control connection; and
    the inactive state comprises a radio resource control inactive state.

12. The method of claim 1, wherein the first network node comprises a distributed unit of a disaggregated base station, and the disaggregated base station comprises one or more distributed units, a central unit control plane, and one or more central unit user planes.

13. A method for wireless communications at a first network node, comprising:
    transmitting, to a user equipment (UE), a connection release message from a second network node instructing the UE to enter an inactive state, the connection release message including a set of routing identifiers, each routing identifier of the set of routing identifiers associated with at least one data radio bearer;
    receiving, from the UE at least in part in response to the transmitted connection release message, a packet comprising data and at least one routing identifier of the set of routing identifiers; and
    transmitting, to a third network node, the data based at least in part on the received at least one routing identifier.

14. The method of claim 13, wherein receiving the data packet comprises:

receiving a protocol data unit that includes a sub protocol data unit and a control element, the data unit comprising the identified data, and the control element comprising the at least one routing identifier, wherein transmitting the packet comprises transmitting the generated protocol data unit.

15. The method of claim 14, wherein the protocol data unit includes a set of sub protocol data units, the set of sub protocol data units including the sub protocol data unit, each sub protocol data unit of the set of sub protocol data units corresponding to a respective routing identifier of the set of routing identifiers.

16. The method of claim 14, wherein:
the protocol data unit comprises a media access control protocol data unit;
the sub protocol data unit comprises a media access control sub protocol data unit or a media access control service data unit; and
and the control element comprises a media access control control element.

17. The method of claim 13, further comprising:
determining, based at least in part on the at least one routing identifier, address information for the third network node, wherein transmitting the data to the third network node is based at least in part on the determined address information.

18. The method of claim 17, wherein the address information comprises an uplink tunneling identifier, a transport network layer address, or a combination thereof.

19. The method of claim 17, wherein:
generating a packet data convergence protocol (PDCP) protocol data unit (PPDU), wherein transmitting the data comprises transmitting the PPDU together with the address information.

20. The method of claim 13, further comprising:
receiving paging information from the second network node; and
transmitting, based at least in part on the at least one routing identifier, the paging information to the UE.

21. The method of claim 13, wherein the first network node comprises a distributed unit, wherein the second network node comprises a control unit control plane, and wherein the third network node comprises a control unit user plane.

22. A method for wireless communications at a second network node, comprising:
transmitting, to a first network node, a connection release message instructing a user equipment (UE) to enter an inactive state, the connection release message including a set of routing identifiers, each routing identifier of the set of routing identifiers associated with at least one data radio bearer; and
receiving, from a third network node, an indication of data transmitted from the UE to the third network node at least in part in response to the transmitted connection release message.

23. The method of claim 22, further comprising:
transmitting, to the third network node, a bearer modification request message; and
receiving, from the third network node in response to the bearer modification request message, a bearer modification response message, wherein transmitting the connection release message is based at least in part on the received bearer modification response message.

24. The method of claim 23, wherein:
the bearer modification request message comprises an indication of a set of suspended data radio bearers and a set of non-suspended data radio bearers, the set of non-suspended data radio bearers comprising the at least one data radio bearer; and
the bearer modification response message comprises an indication of the set of routing identifiers and a set of data radio bearer identifiers associated with the set of routing identifiers.

25. The method of claim 22, further comprising:
determining, for the UE, a set of data radio bearers comprising the at least one data radio bearer for use in an inactive state of the UE; and
identifying a routing identifier of the set of routing identifiers associated with the data radio bearer, wherein transmitting the connection release message is based at least in part on identifying the set of routing identifiers.

26. The method of claim 22, further comprising:
receiving, from the third network node, an indication of downlink data for the UE transmitted from the third network node; and
transmitting, to the first network node based at least in part on receiving the indication of the downlink data, paging information to the first network node.

27. The method of claim 22, further comprising:
receiving, from the third network node, an indication of uplink data from the UE, the uplink data transmitted from the first network node to the third network node.

28. The method of claim 22, wherein the first network node comprises a distributed unit, wherein the second network node comprises a control unit control plane, and wherein the third network node comprises a control unit user plan.

29. An apparatus for wireless communications at a user equipment (UE), comprising:
a processor,
memory coupled with the processor; and
instructions stored in the memory and executable by the processor to cause the apparatus to:
receive, from a first network node, a connection release message instructing the UE to enter an inactive state, the connection release message including a set of routing identifiers, each routing identifier of the set of routing identifiers associated with at least one data radio bearer;
enter the inactive state based at least in part on receiving the connection release message;
identify data to transmit in the inactive state of the UE and at least one routing identifier of the set of routing identifiers associated with the data; and
transmit, in the inactive state, a packet comprising the identified data and the at least one routing identifier.

30. The apparatus of claim 29, wherein the instructions are further executable by the processor to cause the apparatus to:
the instructions to generate a protocol data unit that includes a sub protocol data unit and a control element, the data unit comprising the identified data, and the control element comprising the at least one routing identifier, wherein transmitting the packet are executable by the processor to cause the apparatus to transmit the generated protocol data unit.

31. The apparatus of claim 30, wherein the instructions to generate the media access control protocol data unit further are executable by the processor to cause the apparatus to:
generate the protocol data unit that includes a set of sub protocol data units, the set of sub protocol data units including the sub protocol data unit, each sub protocol data unit of the set of sub protocol data units corresponding to a respective routing identifier of the set of routing identifiers.

32. The apparatus of claim 30, wherein:
the protocol data unit comprises a media access control protocol data unit;
the sub protocol data unit comprises a media access control sub protocol data unit or a media access control service data unit; and
and the control element comprises a media access control control element.

33. The apparatus of claim 29, wherein the instructions are further executable by the processor to cause the apparatus to:
receive an indication of a mapping between the set of routing identifiers and a set of data radio bearers, each routing identifier mapped to at least one data radio bearer of the set of data radio bearers;
identify, from the set of data radio bearers, a data radio bearer associated with the data; and
determine, based at least in part on the received indication of the mapping, the at least one routing identifier of the set of routing identifiers corresponding to the identified data radio bearer.

34. The apparatus of claim 29, wherein the instructions to transmit the packet are executable by the processor to cause the apparatus to:
transmit the packet to the first network node.

35. An apparatus for wireless communications at a first network node, comprising:
a processor,
memory coupled with the processor; and
instructions stored in the memory and executable by the processor to cause the apparatus to:
transmit, to a user equipment (UE), a connection release message from a second network node instructing the UE to enter an inactive state, the connection release message including a set of routing identifiers, each routing identifier of the set of routing identifiers associated with at least one data radio bearer;
receive, from the UE at least in part in response to the transmitted connection release message, a packet comprising data and at least one routing identifier of the set of routing identifiers; and
transmit, to a third network node, the data based at least in part on the received at least one routing identifier.

* * * * *